US012804431B2

(12) United States Patent

Gao et al.

(10) Patent No.: US 12,804,431 B2
(45) Date of Patent: Nov. 17, 2026

(54) COMMUNICATION METHOD AND DEVICE

(71) Applicant: GUANGDONG OPPO MOBILE TELECOMMUNICATIONS CORP., LTD., Dongguan (CN)

(72) Inventors: Ning Gao, Dongguan (CN); Lei Huang, Singapore (SG); Chaoming Luo, Dongguan (CN)

(73) Assignee: GUANGDONG OPPO MOBILE TELECOMMMUNICATIONS CORP., LTD., Dongguan (CN)

( * ) Notice: Subject to any disclaimer, the term of this patent is extended or adjusted under 35 U.S.C. 154(b) by 259 days.

(21) Appl. No.: 18/667,962

(22) Filed: May 17, 2024

(65) Prior Publication Data

US 2024/0306020 A1 Sep. 12, 2024

Related U.S. Application Data

(63) Continuation of application No. PCT/CN2021/131323, filed on Nov. 17, 2021.

(51) Int. Cl.
*H04W 24/08* (2009.01)
*H04W 84/12* (2009.01)

(52) U.S. Cl.
CPC ............ *H04W 24/08* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2015/0156709 | A1 | 6/2015 | Shukla | |
| 2015/0172902 | A1 | 6/2015 | Kasslin | |
| 2015/0350866 | A1 | 12/2015 | Patil | |
| 2020/0145919 | A1 | 5/2020 | Jung | |
| 2021/0314732 | A1* | 10/2021 | Chen | H04W 4/027 |
| 2021/0360524 | A1 | 11/2021 | Jung | |
| 2022/0070710 | A1* | 3/2022 | Lim | H04W 72/04 |
| 2023/0254053 | A1* | 8/2023 | Kim | H04B 17/24 370/252 |
| 2023/0319877 | A1* | 10/2023 | Chitrakar | H04W 74/0808 370/329 |

FOREIGN PATENT DOCUMENTS

| | | | |
|---|---|---|---|
| CN | 104488349 | A | 4/2015 |
| CN | 105993185 | A | 10/2016 |
| CN | 106465092 | A | 2/2017 |
| CN | 112956248 | A | 6/2021 |

OTHER PUBLICATIONS

International Search Report in the international application No. PCT/CN2021/131323, mailed on Aug. 16, 2022. 6 pages with English translation.
Written Opinion of the International Search Authority in the international application No. PCT/CN2021/131323, mailed on Aug. 16, 2022. 6 pages with English translation.

(Continued)

*Primary Examiner* — Nguyen H Ngo
(74) *Attorney, Agent, or Firm* — Ladas & Parry LLP

(57) ABSTRACT

A communication method includes: a first device sends and/or receives first information, the first information including sensing related information.

20 Claims, 29 Drawing Sheets

(56) References Cited

OTHER PUBLICATIONS

Wi-Fi Alliance. ""NAN Ranging", "NAN Information Element, attributes, and frame formats"", Wi-Fi Aware Specification Version 3.2, Oct. 23, 2020 (Oct. 23, 2020), section 8 and 9. 214 pages.
Claudio da Silva, Specification Framework for TGbf, IEEE P802.11 Wireless LANs, IEEE 802.11-yy/xxxxr0, Jul. 20, 2021. the whole document. 9 pages.
Claudio da Silva et al, Enhancing Client-based Sensing: Sensing by Proxy, IEEE 802.11-21/1692r0, Oct. 22, 2021. the whole document. 13 pages.
Chaoming Luo et al, Proxy for non-AP Initiator, IEEE 802.11-21/1684r0, Oct. 14, 2021. the whole document. 9 pages.
Junghoon Suh et al, Simplified Scaling Factor Feedback for CSI Matrices Quantization, IEEE 802.11-21/1676r1, Oct. 12, 2021. the whole document. 14 pages.
Steve Shellhammer et al, Low-Complexity Scaling and Quantization for CSI Report, IEEE 802.11-21/1573r0, Sep. 24, 2021. the whole document. 19 pages.
Chaoming Luo et al, Discussion on reporting procedure, IEEE 802.11-21/1438r1, Sep. 1, 2021. the whole document. 8 pages.
Rui Du et al, Truncated Power Delay Profile—follow up, IEEE 802.11-21/1288r1, Aug. 24, 2021. the whole document. 18 pages.
Draft Standard for Information technology—Tele-communications and information exchange between systems Local and metropolitan area networks—Specific requirements, IEEE P802.11be™/D1.2, Sep. 2021. section: 7-730. 735 pages.
IEEE Standard for Information Technology—Telecommunications and Information Exchange between Systems Local and Metropolitan Area Networks—Specific Requirements. IEEE Std 802.11™—2020 (Revision of IEEE Std 802.11-2016). section: 10-4370. 4379 pages.
Cheng Chen et al, Wi-Fi Sensing Definitions, IEEE 802.11-20/1849r4, Nov. 15, 2020. the whole document. 15 pages.
Rui Du et al, Definitions and scenarios of the WLAN sensing—follow ups, IEEE 802.11-21/0147r3, Jan. 26, 2021. the whole document. 21 pages.
Cheng Chen et al, Overview of Wi-Fi sensing protocol, IEEE 802.11-20/1851r3, Nov. 12, 2020. the whole document. 12 pages.
Insun Jang et al, Discussion on WLAN Sensing Procedure, IEEE 802.11-20/1804r1, Nov. 9, 2020. the whole document. 13 pages.
Cheng Chen et al, Overview of WLAN sensing protocol, IEEE 802.11-20/1232r0, Aug. 16, 2020. the whole document. 11 pages.
Mengshi Hu et al, Threshold Based Sensing Measurement, IEEE 802.11-21/0351r5, May 10, 2021. the whole document. 19 pages.
Solomon Trainin, Sensing session and measurement exchange identification, IEEE 802.11-21/0644r3, May 10, 2021. the whole document. 14 pages.
Cheng Chen et al, Discussions on sensing measurement flows, IEEE 802.11-21/0990r2, Jun. 16, 2021. the whole document. 15 pages.

* cited by examiner

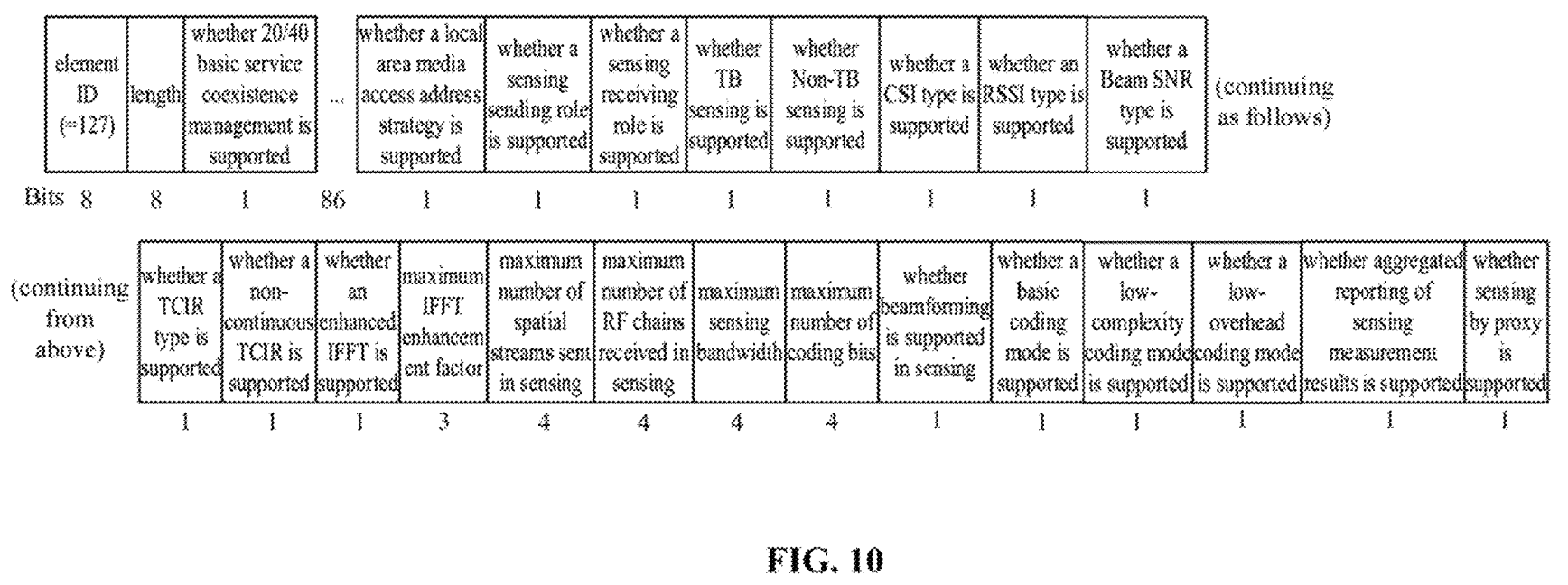

| | element ID (=127) | length | whether 20/40 basic service coexistence management is supported | ... | whether a local area media access address strategy is supported | whether a sensing sending role is supported | whether a sensing receiving role is supported | whether TB sensing is supported | whether Non-TB sensing is supported | whether a CSI type is supported | whether an RSSI type is supported | whether a Beam SNR type is supported |
|---|---|---|---|---|---|---|---|---|---|---|---|---|
| Bits | 8 | 8 | 1 | 86 | 1 | 1 | 1 | 1 | 1 | 1 | 1 | 1 |

(continuing as follows)

(continuing from above)

| whether a TCIR type is supported | whether a non-continuous TCIR is supported | whether an enhanced IFFT is supported | maximum IFFT enhancement factor | maximum number of spatial streams sent in sensing | maximum number of RF chains received in sensing | maximum sensing bandwidth | maximum number of coding bits | whether maximum beamforming is supported in sensing | whether a basic coding mode is supported | whether a low-complexity coding mode is supported | whether a low-overhead coding mode is supported | whether aggregated reporting of sensing measurement results is supported | whether sensing by proxy is supported |
|---|---|---|---|---|---|---|---|---|---|---|---|---|---|
| 1 | 1 | 1 | 3 | 4 | 4 | 4 | 4 | 1 | 1 | 1 | 1 | 1 | 1 |

FIG. 10

| | | | | | | | | | | | | | | |
|---|---|---|---|---|---|---|---|---|---|---|---|---|---|---|
| | element ID (=255) | length | element ID extension (=99) | whether a sensing sending role is supported | whether a sensing receiving role is supported | whether TB sensing is supported | whether Non-TB sensing is supported | whether a CSI type is supported | whether an RSSI type is supported | whether a Beam SNR type is supported | whether a TCIR type is supported | whether a non-continuous TCIR is supported | whether an enhanced IFFT is supported | maximum IFFT enhancement factor |
| Bits | 8 | 8 | 1 | 1 | 1 | 1 | 1 | 1 | 1 | 1 | 1 | 1 | 1 | 3 |

(continuing as follows)

(continuing from above)

| | | | | | | | | | | | | | |
|---|---|---|---|---|---|---|---|---|---|---|---|---|---|
| maximum number of spatial streams sent in sensing when the sensing bandwidth is less than or equal to 80 MHz | maximum number of spatial streams sent in sensing when the sensing bandwidth is equal to 160 MHz | maximum number of spatial streams sent in sensing when the sensing bandwidth is equal to 320 MHz | maximum number of RF chains received in sensing when the sensing bandwidth is less than 80 MHz | maximum number of RF chains received in sensing when the sensing bandwidth is equal to 160 MHz | maximum number of RF chains received in sensing when the sensing bandwidth is equal to 320 MHz | maximum sensing bandwidth | maximum number of coding bits | whether beamforming is supported in sensing | whether a basic coding mode is supported | whether a low-complexity coding mode is supported | whether a low-overhead coding mode is supported | whether aggregated reporting of sensing measurement results is supported | whether sensing by proxy is supported |
| 4 | 4 | 4 | 4 | 4 | 4 | 4 | 4 | 1 | 1 | 1 | 1 | 1 | 1 |

FIG. 13

COMMUNICATION METHOD AND DEVICE

CROSS-REFERENCE TO RELATED APPLICATION

This application is a continuation of International Application No. PCT/CN2021/131323 filed on Nov. 17, 2021, the disclosure of which is hereby incorporated by reference in its entirety.

BACKGROUND

Wireless Local Area Network (WLAN) sensing may include a method and application for sensing people or objects in an environment by measuring variations of WLAN signals scattered and/or reflected by the people or objects. The WLAN sensing is usually implemented by using WLAN signals conforming to wireless communication standards. In the WLAN sensing, contents of interacted information are not clear, and communication functions which may be supported are not enough.

SUMMARY

The disclosure relates to the field of communications, and more particularly, to a communication method and device.

Embodiments of the disclosure provide a communication method and device capable of supporting richer communication functions.

An embodiment of the disclosure provides a communication method, the communication method includes the following operations. A first device sends and/or receives first information, the first information including sensing-related information.

An embodiment of the disclosure provides a communication device, the communication device includes a processor, a memory and a transceiver. The memory is configured to store computer-executable instructions. The processor is configured to invoke and run the computer-executable instructions stored in the memory to perform at least one of: sending or receiving first information through the transceiver. The first information includes sensing-related information An embodiment of the disclosure provides a non-transitory computer-readable storage medium having stored thereon computer-executable instructions which, when executed by a processor of a first device, cause the first device to perform at least one of: sending or receiving first information. The first information comprises sensing-related information

BRIEF DESCRIPTION OF THE DRAWINGS

FIG. 10 is a schematic diagram of a first scheme of extending a capability element.

FIG. 13 is a schematic diagram of a second scheme of sensing a capability element.

DETAILED DESCRIPTION

Technical solutions in the embodiments of the disclosure will be described below with reference to figures in the embodiments of the disclosure.

The technical solutions of the embodiments of the disclosure may be applied to various communication systems, such as a Wireless Local Area Network (WLAN), Wireless Fidelity (WiFi), or other communication systems.

Figure 1:
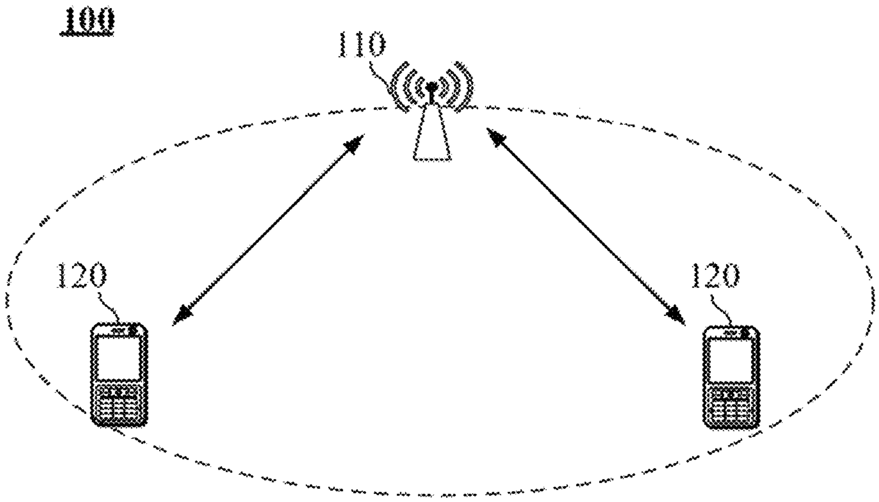
FIG. 1 is a schematic diagram of an application scenario according to an embodiment of the disclosure.

Exemplarily, a communication system 100 to which the embodiments of the disclosure are applied is shown in FIG. 1. The communication system 100 may include an Access Point (AP) 110 and a STATION (STA) 120 accessing a network through the AP 110.

In some scenarios, the AP is also referred to as an AP STA, that is, the AP is also a kind of STA in a certain sense.

In some scenarios, the STA is also referred to as a non-AP STA.

Communication in the communication system 100 may be a communication between the AP and the non-AP STA, or a communication between two non-AP STAs, or a communication between the STA and a peer STA, where the peer STA may refer to a device communicating with a peer side of the STA. For example, the peer STA may be the AP or the non-AP STA.

The AP is equivalent to a bridge connecting a wired network to a wireless network, its main function is to connect various clients of the wireless network together, and then connect the wireless network to the Ethernet. The AP device may be a terminal device (such as a mobile phone) with a WiFi chip or a network device (such as a router) with a WiFi chip.

It is to be understood that the role of the STA in the communication system is not absolute. For example, in some scenarios, when the mobile phone is connected to the router, the mobile phone is a non-AP STA; and when the mobile phone serves as a hotspot for other mobile phones, the mobile phone plays a role of an AP.

The AP and the non-AP STA may be devices applied in Vehicle to everything (V2X); Internet of Things (IoT) nodes, sensors or the like in the IoT; smart cameras, smart remote controls, smart water meters, smart electricity meter or the like in a smart home; and sensors in a smart city, etc.

In some embodiments, the non-AP STA may support the 802.11be standard. The non-AP STA may also support multiple current and future WLAN standards of the 802.11 family, such as 802.11ax, 802.11ac, 802.11n, 802.11g, 802.11b, 802.11a, etc.

In some embodiments, the AP may be a device supporting the 802.11be standard. The AP may also be a device supporting multiple current and future WLAN standards of the 802.11 family, such as 802.11ax, 802.11ac, 802.11n, 802.11g, 802.11b, 802.11a, etc.

In the embodiments of the disclosure, the STA may be a mobile phone, a tablet computer (pad), a computer, a Virtual Reality (VR) device, an Augmented Reality (AR) device, a wireless device in industrial control, a set-top box, a wireless device in self driving, a vehicle communication device, a wireless device in remote medical, a wireless device in a smart grid, a wireless device in transportation safety, a wireless device in a smart city, or a wireless device in a smart home, a wireless communication chip/Application Specific Integrated Circuit (ASIC)/System on Chip (SOC)/ or the like, which support WLAN/WiFi technologies.

Bands supported by the WLAN technology may include, but are not limited to, a low frequency band (such as 2.4 GHZ, 5 GHZ, 6 GHZ) and a high frequency band (such as 60 GHZ).

FIG. 1 exemplarily shows one AP STA and two non-AP STAs. Optionally, the communication system 100 may include multiple AP STAs and other numbers of non-AP STAs, which is not limited in the embodiments of the disclosure.

It is to be understood that terms "system" and "network" herein are often used interchangeably in the context. In the context, a term "and/or" is only an association relationship describing associated objects, and indicates that there may be three relationships. For example, A and/or B may indicate three situations: A exists alone, A and B exist simultaneously, and B exists alone. Furthermore, in the context, a character "/" usually indicates that anterior and posterior associated objects are in a "or" relationship.

It is to be understood that "indication" mentioned in the embodiments of the disclosure may be a direct indication, or may be an indirect indication, or may mean that there is an association relationship. For example, A indicates B, which may mean that: A directly indicates B, for example, B may be obtained through A; or, A indirectly indicates B, for example, A indicates C, and B may be obtained through C; or, there is an association relationship between A and B.

In descriptions of the embodiments of the disclosure, a term "corresponding" may mean that there are direct or indirect correspondences between two items; or, may mean that there is an association relationship between two items; or, may be in a relationship such as indicating and indicated, configuring and configured, etc.

In order to facilitate understanding the technical solutions of the embodiments of the disclosure, related technologies of the embodiments of the disclosure are described below. The following related technologies used as optional solutions may be arbitrarily combined with the technical solutions of the embodiments of the disclosure, all of which belong to the scope of protection of the embodiments of the disclosure.

I: WLAN Sensing and Participants

WLAN terminals participating in sensing may include roles such as a sensing session initiator (it may be abbreviated as a sensing initiator), a sensing session responder (it may be abbreviated as a sensing responder), a sensing signal transmitter (it may be abbreviated as a sensing transmitter), a sensing signal receiver (it may be abbreviated as a sensing receiver), etc.

Figures 2A, 2B, 2C:
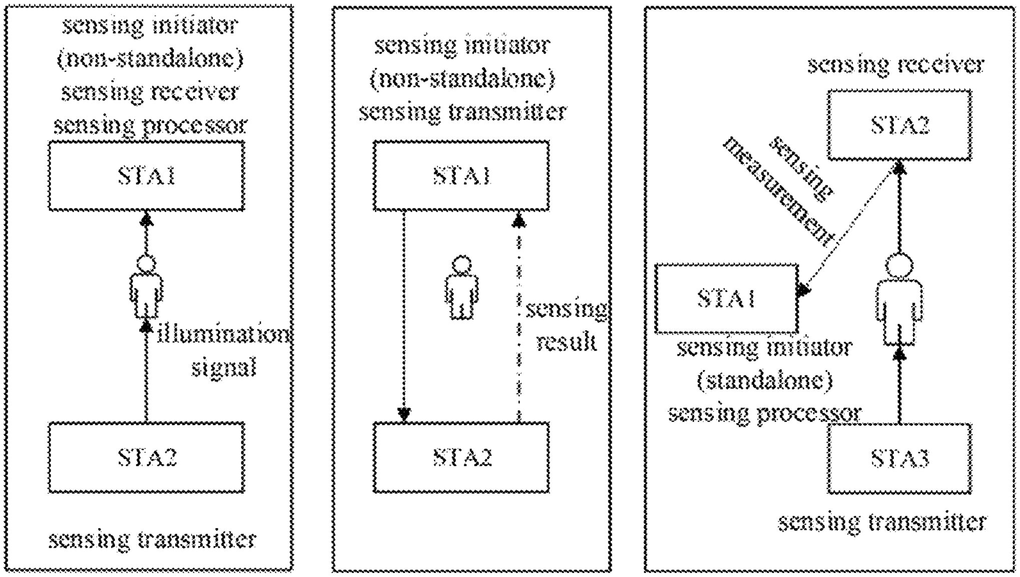
FIG. 2A to FIG. 2J are schematic diagrams of WLAN sensing and participants.
Figure 2D:
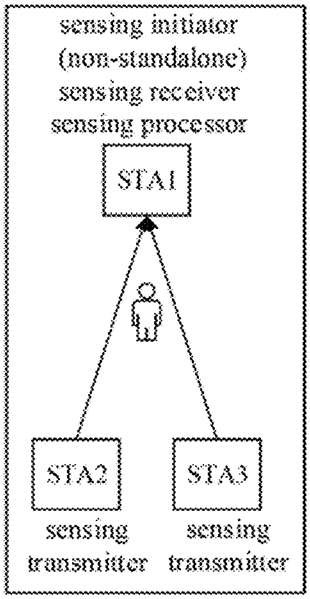
Figure 2E:
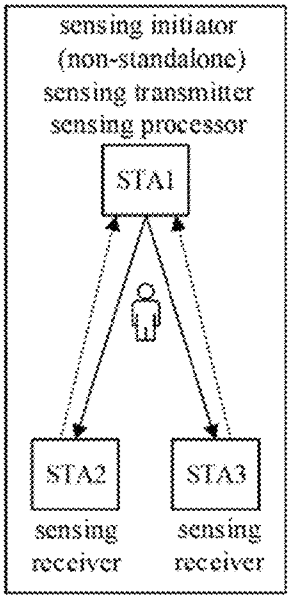
Figure 2F:
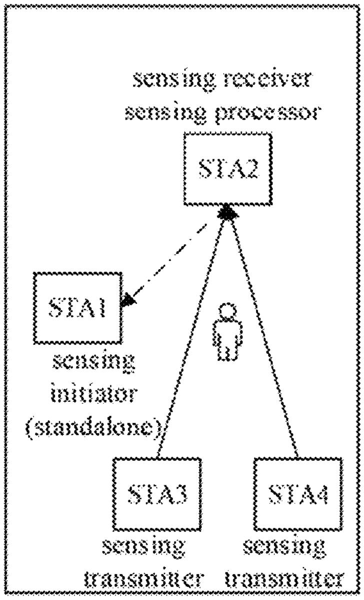
Figure 2G:
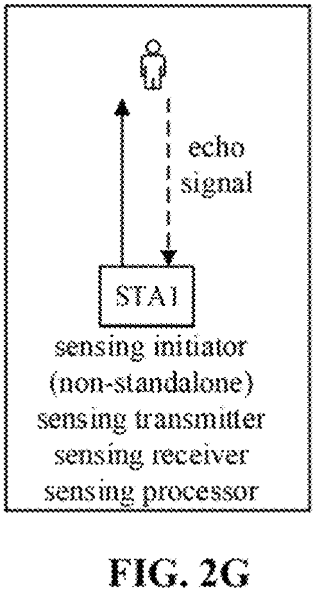
Figure 2H:
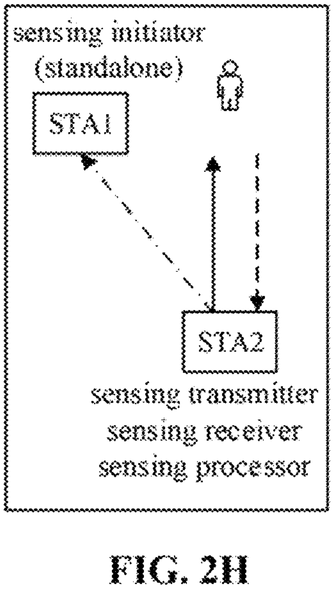
Figure 2I:
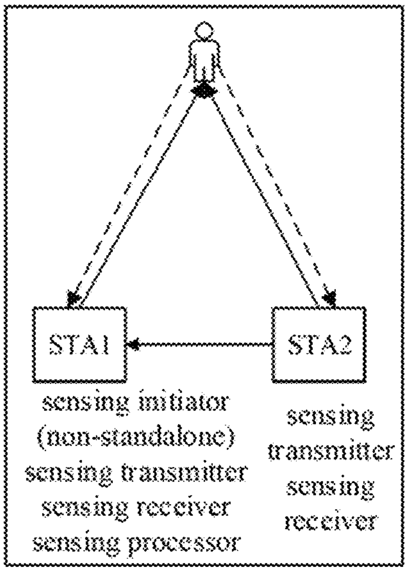
Figure 2J:
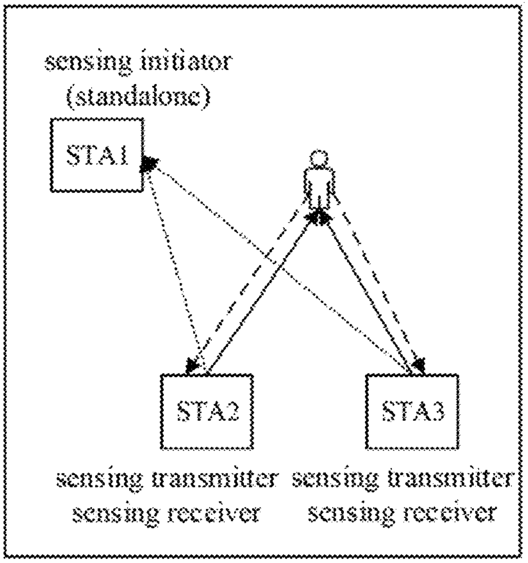

For example, with reference to FIG. 2A, STA1 is a sensing receiver, also a sensing initiator (non-standalone), and is also a sensing processor; and STA2 is a sensing transmitter. With reference to FIG. 2B, STA1 is a sensing initiator (non-standalone), and is also a sensing transmitter; and STA2 is a sensing receiver, and is also a sensing processor. With reference to FIG. 2C, STA1 is a sensing initiator (standalone), and is also a sensing processor; STA2 is a sensing receiver; and STA3 is a sensing transmitter. With reference to FIG. 2D, STA1 is a sensing initiator (non-standalone), and is also a sensing receiver and a sensing processor; and each of STA2 and STA3 is a sensing transmitter. With reference to FIG. 2E, STA1 is a sensing initiator (non-standalone), and is also a sensing transmitter and a sensing processor; and each of STA2 and STA3 is a sensing receiver. With reference to FIG. 2F, STA1 is a sensing initiator (standalone); STA2 is a sensing receiver and a sensing processor; and each of STA3 and STA4 is a sensing transmitter. With reference to FIG. 2G, STA1 is a sensing initiator (non-standalone), and is also a sensing transmitter, a sensing receiver and a sensing processor. With reference to FIG. 2H, STA1 is a sensing initiator (non-standalone); and STA2 is a sensing transmitter, a sensing receiver and a sensing processor. With reference to FIG. 2I, STA1 is a sensing initiator (non-standalone), a sensing transmitter, a sensing receiver and a sensing processor; and STA2 is a sensing transmitter and a sensing receiver. With reference to FIG. 2J, STA1 is a sensing initiator (standalone) and a sensing processor; STA2 is a sensing transmitter and a sensing receiver; and STA3 is also a sensing transmitter and a sensing receiver.

Figure 3A:
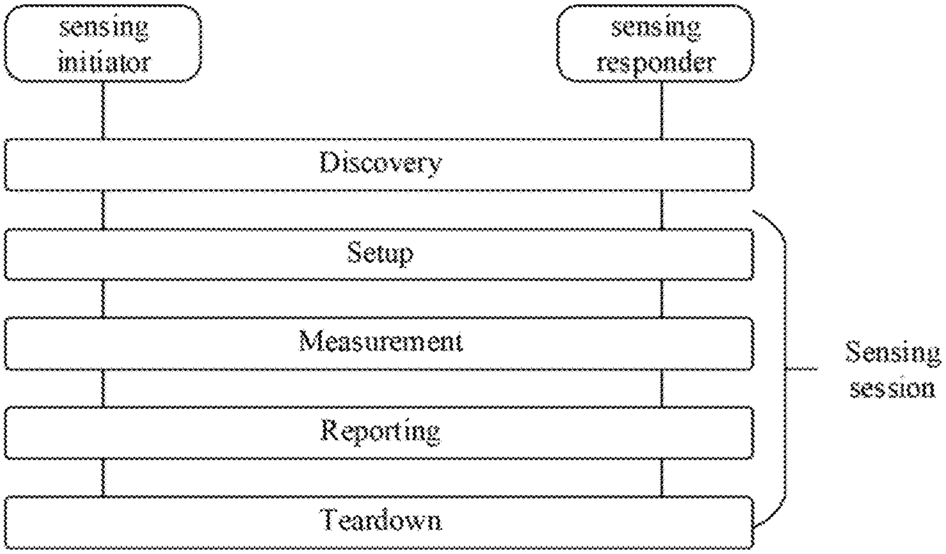
FIG. 3A is a schematic flowchart of a WLAN sensing session.

With reference to FIG. 3A, the WLAN sensing session includes one or more of the following phases: session setup (Setup); sensing measurement (Measurement); sensing reporting (Reporting); session teardown (Teardown). A WLAN terminal may have one or more roles in one sensing session. For example, a sensing session initiator may be only the sensing session initiator, or may become a sensing signal transmitter, or may become a sensing signal receiver, or may be the sensing signal transmitter and the sensing signal receiver simultaneously.

II: Overall Process of WLAN Sensing Session

In the session setup phase, a sensing session is set up, sensing session participants and their roles (including the sensing signal transmitter and the sensing signal receiver) are determined, operation parameters related to the sensing session are determined, and optionally, the parameters are exchanged between terminals.

In the sensing measurement phase, sensing measurement is performed, and the sensing signal transmitter sends the sensing signal to the sensing signal receiver.

In the sensing reporting phase, a measurement result is reported, and the sensing signal receiver may need to report the measurement result to the sensing session initiator, depending on application scenarios.

In the session teardown phase, the terminal stops measurement and terminates the sensing session.

III: Parameter Negotiation of WLAN Sensing Session

Figure 3B:
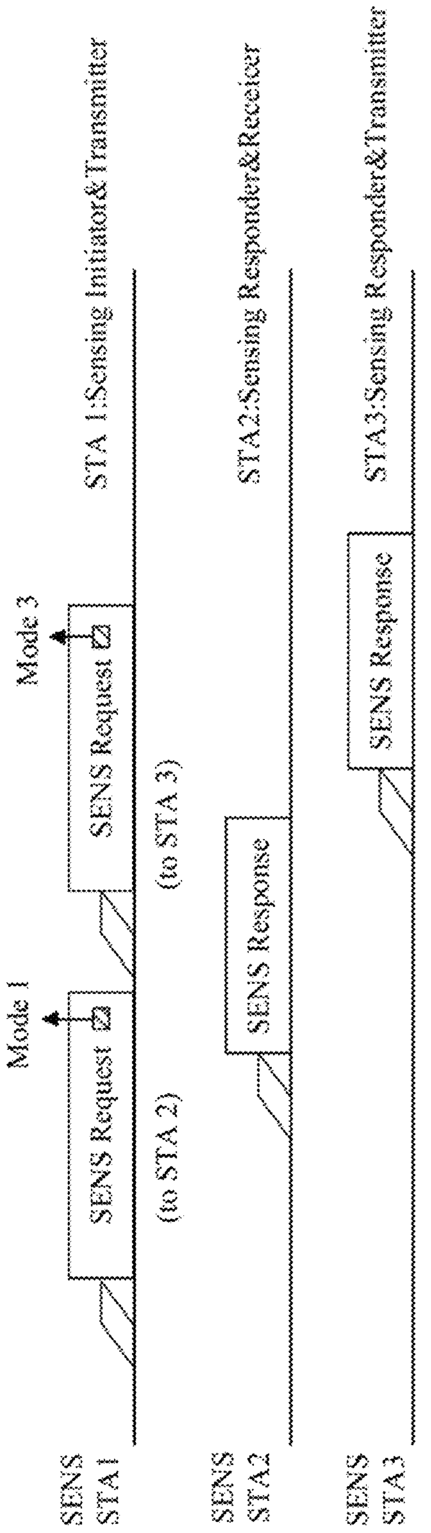
FIG. 3B is a schematic diagram of parameter negotiation of a WLAN sensing session.

When the sensing session is set up, sensing roles and operation parameters may need to be negotiated one-by-one between terminals, or the terminals declare their own roles and operation parameters (for example, through beacon frames or other special frames). For example, with reference to FIG. 3B, SENS STA1 may be a sensing initiator and a sensing transmitter. SENS STA2 may be a sensing responder and a sensing receiver. SENS STA3 may be a sensing responder and a sensing transmitter. In Mode 1, the terminal SENS STA1 sends a sensing request (SENS Request) to SENS STA2, and SENS STA2 sends a sensing response (SENS Response). In Mode 3, the terminal SENS STA1 sends a sensing request (SENS Request) to SENS STA3, and SENS STA3 sends a sensing response (SENS Response).

IV: Threshold-Based Sensing Measurement

Data amount of a sensing measurement result is usually large, for example, data of Channel State Information (CSI) in one measurement may reach 4K~40K bits. In order to reduce network load caused by reporting the sensing measurement result, a measurement threshold may be set. When variation between the current measurement result and the previous measurement result is less than the threshold, the sensing signal receiver reports the sensing result; otherwise, the sensing signal receiver does not report the sensing result.

Figure 4A:
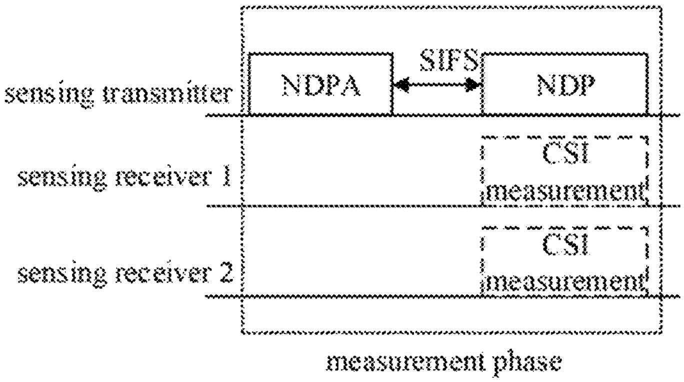
FIG. 4A and FIG. 4B are schematic diagrams of a threshold-based sensing measurement.
Figure 4B:
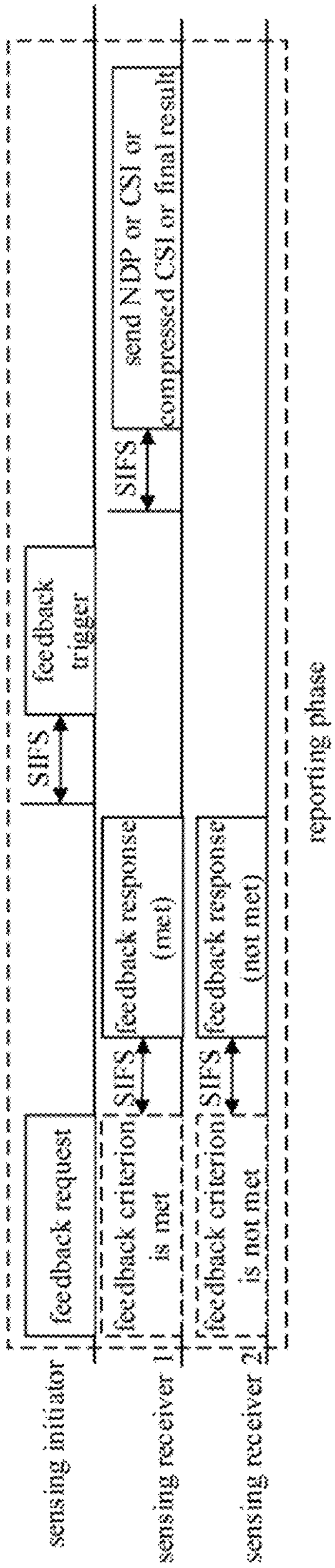

For example, as shown in FIG. 4A, in the measurement phase, the sensing transmitter may send a measurement announcement frame (Null Data Packet Announcement (NDPA)), and send a Null Data Packet (NDP) after a Short Interframe Space (SIFS). The sensing receiver 1 and the sensing receiver 2 may perform CSI measurement. As shown in FIG. 4B, in the reporting phase, the sensing initiator sends a feedback request. The sensing receiver 1 determines that a feedback criterion is met, and sends a feedback response representing that it is met (Met). The sensing receiver 2 determines that the feedback criterion is not met, and sends a feedback response representing that it is not met (Not met). Then, the sensing initiator sends a feedback trigger, and the sensing receiver 1 sends NDP, CSI, compressed CSI or a final result.

The sensing session initiator may set multiple groups of measurement parameters. A group of measurement parameters may be identified by a measurement setup identifier (ID), may be equivalent to a burst group, and may be applied to multiple measurements. Another group of measurement parameters may be identified by a measurement instance ID, and may be equivalent to burst.

V: Measurement Setup and Measurement Instance

Figure 5:
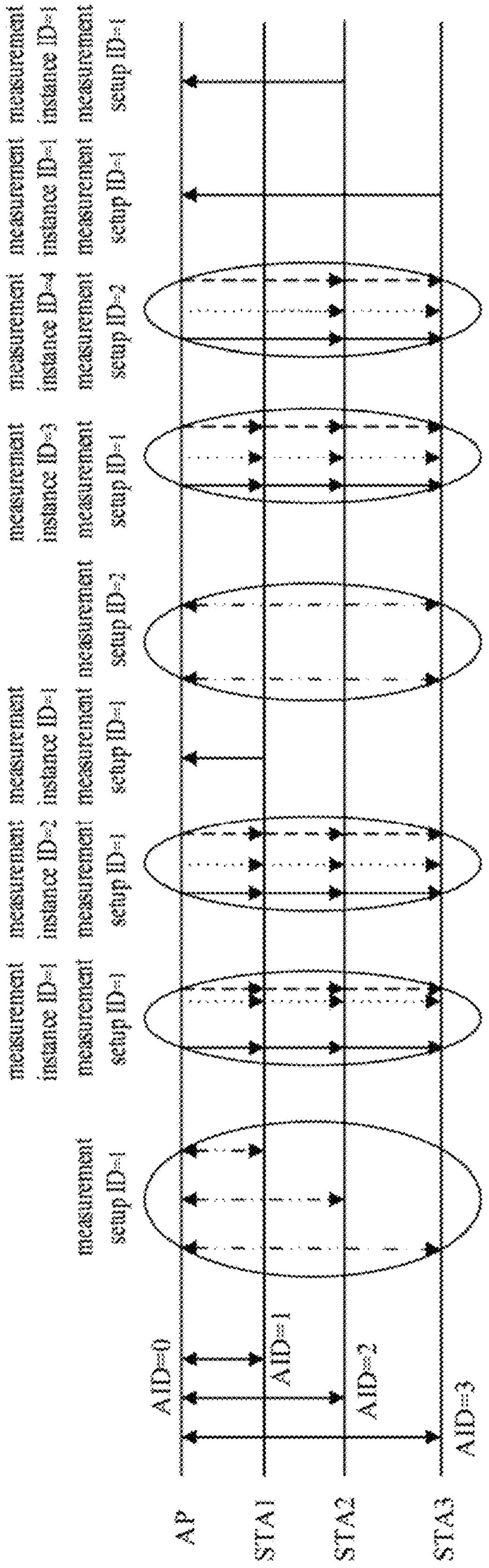
FIG. 5 is a schematic diagram of measurement setup and instance.

For example, with reference to FIG. 5, an association identifier (AID) of the AP=0, AID of STA1=1, AID of STA2=2, and an unassociation identifier (UID) of STA3=3. The AP may establish measurement setup with STA1, STA2 and STA3 at different time points, and the measurement setup ID=1. The AP may send a sensing measurement polling frame, a sensing announcement frame and a sensing measurement frame to STA1, STA2 and STA3 simultaneously, and the measurement setup ID=1 and the measurement instance ID=1. The AP may send the sensing measurement polling frame, the sensing announcement frame and the sensing measurement frame to STA1, STA2 and STA3 simultaneously, and the measurement setup ID=1 and the measurement instance ID=2. STA1 may send a sensing measurement reporting frame to the AP, and report a sensing measurement result with the measurement setup ID=1 and the measurement instance ID=1.

The AP may establish measurement setup with STA2 and STA3 at different time points, and the measurement setup ID=2. The AP may send a sensing measurement polling frame, a sensing announcement frame and a sensing measurement frame to STA1, STA2 and STA3 simultaneously, and the measurement setup ID=1 and the measurement instance ID=3. The AP may send the sensing measurement polling frame, the sensing announcement frame and the sensing measurement frame to STA2 and STA3 simultaneously, and the measurement setup ID=2 and the measurement instance ID=4. STA3 may send a sensing measurement reporting frame to the AP, and report a sensing measurement result with the measurement setup ID=1 and the measurement instance ID=1. STA2 may send a sensing measurement reporting frame to the AP, and report a sensing measurement result with the measurement setup ID=1 and the measurement instance ID=1.

VI: Trigger Based (TB) Measurement Process

Figure 6:
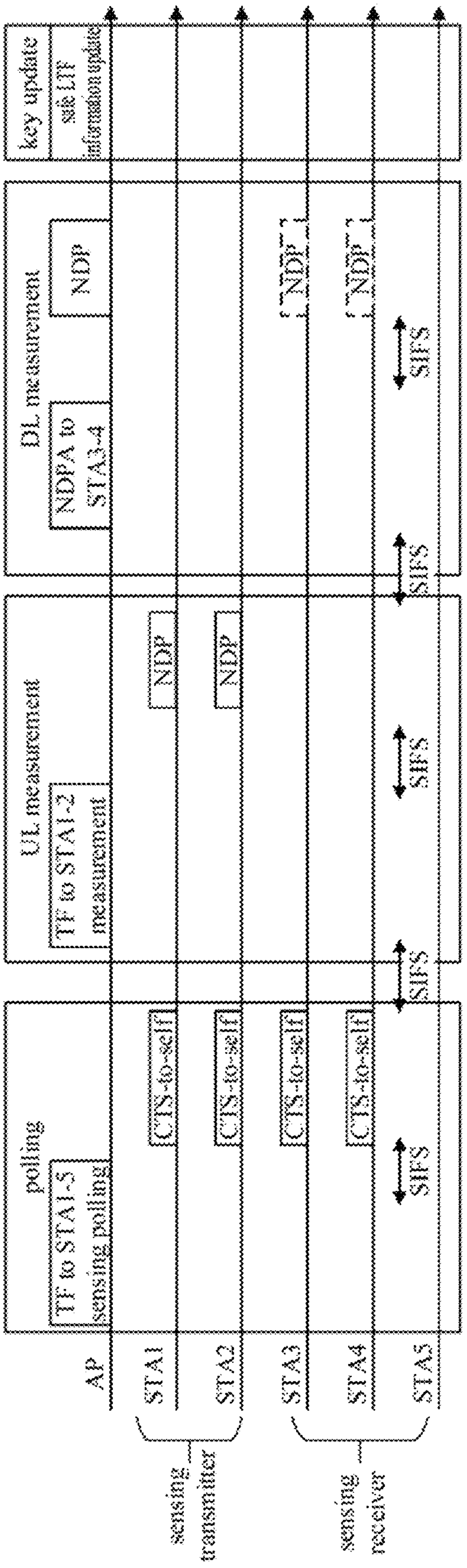
FIG. 6 is a schematic diagram of a Trigger Based (TB) measurement process.

A TB measurement process includes polling, uplink (UL) measurement (UL sensing sounding), downlink (DL) measurement (DL sensing sounding), and key update. As shown in FIG. 6, each of STA1 and STA2 is a sensing transmitter, and each of STA3, STA4 and STA5 is a sensing receiver.

Polling should always be here to check the availability of responder STAs before performing the actual sensing measurement.

Here STA1-4 responds with Clear To Send-to self (CTS-to-self) to confirm they will participate in upcoming sensing sounding.

STA5 does not send CTS-to-self back, so the AP will not include STA5 in upcoming sensing sounding.

UL sensing sounding is optionally present, conditioned on at least one sensing transmitter responds in the polling.

The AP sends a Trigger Frame (TF) to STA1-2 to solicit NDP packet transmission to do UL sensing sounding.

NDP from STA1-2 could be transmitted simultaneously in UL Multiple-Input Multiple-Output (UL-MIMO)/UL Orthogonal Frequency Division Multiple Access (UL-OFDMA.

DL sensing sounding is optionally present, conditioned on at least one sensing receiver responds in the polling.

The AP sends NDPA+NDP to STA3-4 to perform DL sensing sounding.

Key update is optionally present if secure Long Training Field (LTF) information needs to be updated and communicated to STAs.

The updated information may be carried in an action or management frame.

VII: TB Measurement Process

Figure 7A:
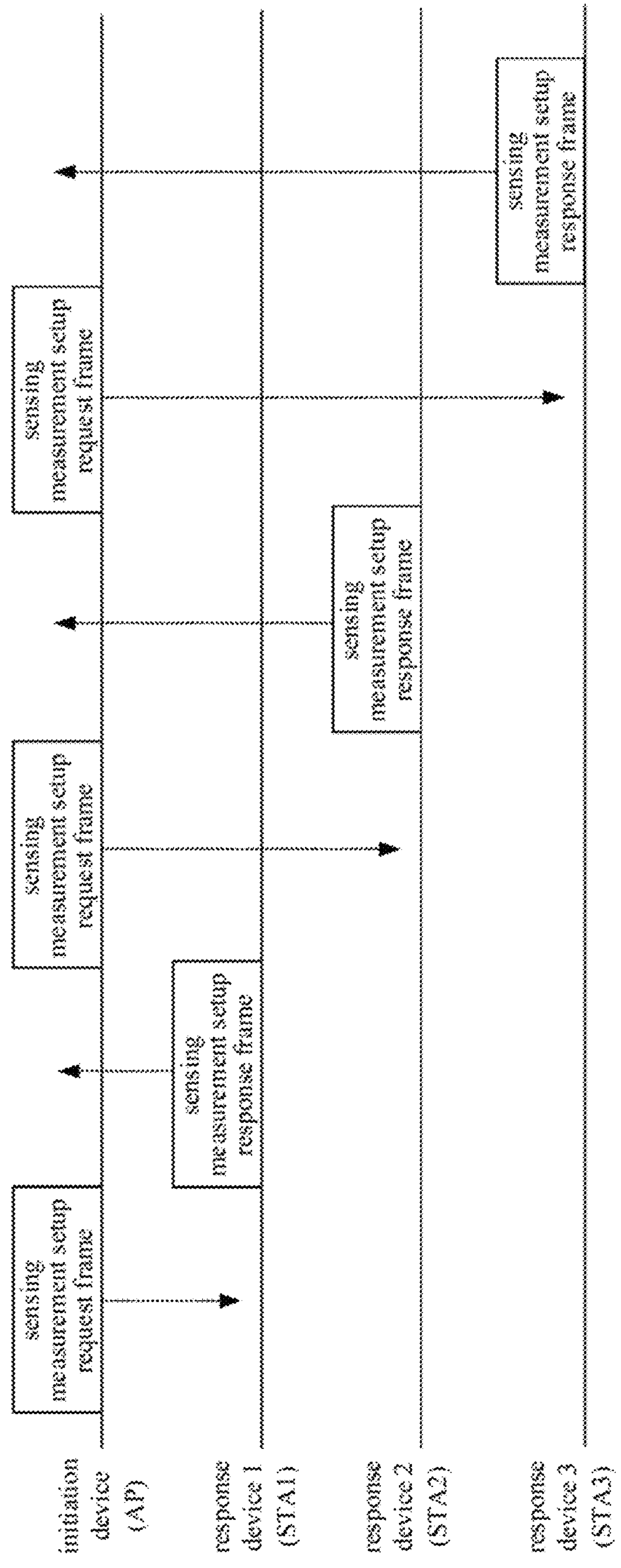
FIG. 7A, FIG. 7B and FIG. 7C are schematic diagrams of a TB measurement process.
Figure 7B:
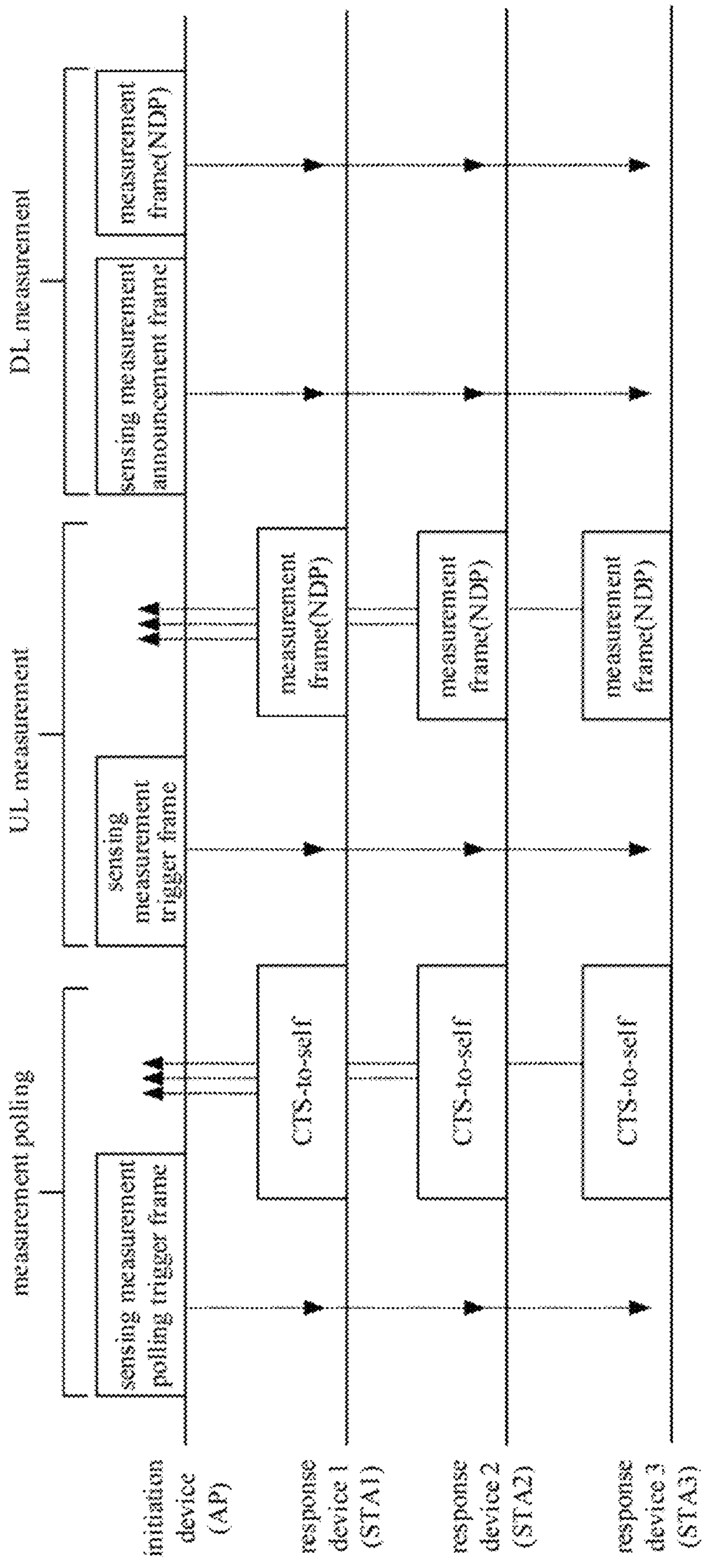
Figure 7C:
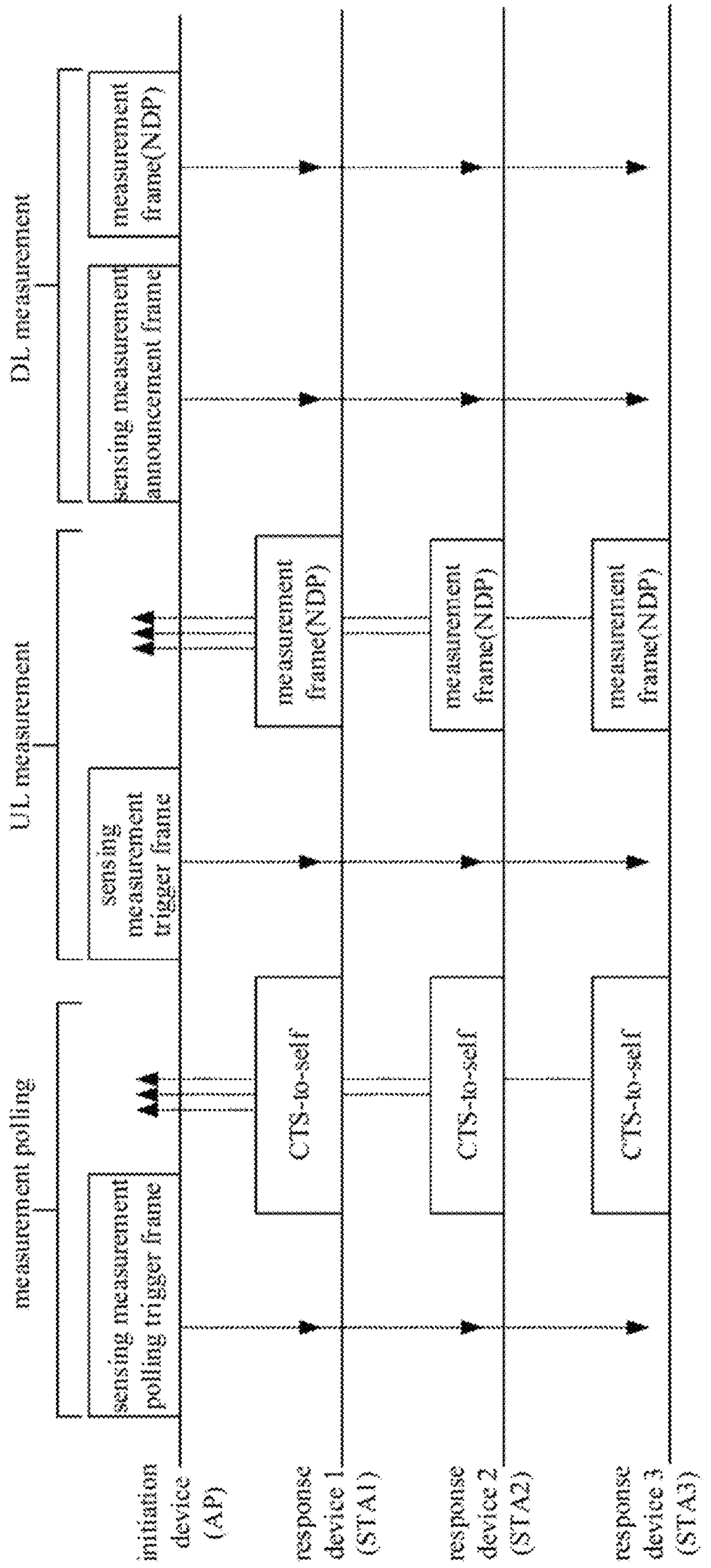

A TB measurement process includes three phases, i.e., a sensing measurement setup phase, a sensing measurement phase and a sensing measurement reporting phase, as shown in FIG. 7A, FIG. 7B and FIG. 7C respectively.

As shown in FIG. 7A, processes of the TB sensing measurement setup phase may include: a certain initiation device (such as the AP) may send sensing measurement setup request frames to multiple response devices (for example, response devices 1, 2, 3, which are STA1, STA2, STA3 respectively). STA1, STA2, STA3 send sensing measurement setup response frames to the AP in different time periods respectively.

As shown in FIG. 7B, processes of the TB sensing measurement phase may include: in a measurement polling process, the initiation device (such as the AP) may send sensing measurement polling trigger frames to multiple response devices (for example, response devices 1, 2, 3, which are STA1, STA2, STA3 respectively) simultaneously. STA1, STA2, STA3 send CTS-to-self frames to the AP in the same time period respectively. In a UL measurement process, the initiation device (such as the AP) sends sensing measurement trigger frames to the response devices 1, 2, 3 in the same time period respectively, and receives measurement frames (such as NDP) fed back by the response devices. In a DL measurement process, the initiation device (such as the AP) sends sensing measurement announcement frames to the response devices 1, 2, 3 in the same time period respectively, and the initiation device (such as the AP) sends measurement frames to the response devices 1, 2, 3 in the same time period respectively. The CTS-to-self frame is a frame format defined in relevant standards, and is used here to respond to a sensing polling trigger frame.

As shown in FIG. 7C, processes of the TB sensing reporting phase may include: in a reporting preparation process, the initiation device (such as the AP) may send sensing feedback request frames to multiple response devices (for example, response devices 1, 2, 3, which are STA1, STA2, STA3 respectively) simultaneously. STA1, STA2, STA3 send sensing feedback response frames to the AP in the same time period respectively. In a reporting process, the initiation device (such as the AP) sends sensing measurement reporting trigger frames to the response devices 1, 2, 3 in a first time period respectively, and the response devices 1, 2 feed sensing measurement reporting frames back to the initiation device in the same time period respectively; and the initiation device (such as the AP) sends a sensing measurement reporting trigger frame to the response device 3 in a second time period, and the response device 3 feeds back a sensing measurement reporting frame to the initiation device.

VIII: Non-Trigger Based (Non-TB) Measurement Process

A Non-TB measurement process includes two phases, i.e., a sensing measurement setup phase and a sensing measurement reporting phase, there are three situations in the sensing measurement reporting phase, as shown in FIG. 8A, FIG. 8B, FIG. 8C and FIG. 8D respectively.

Figure 8A:
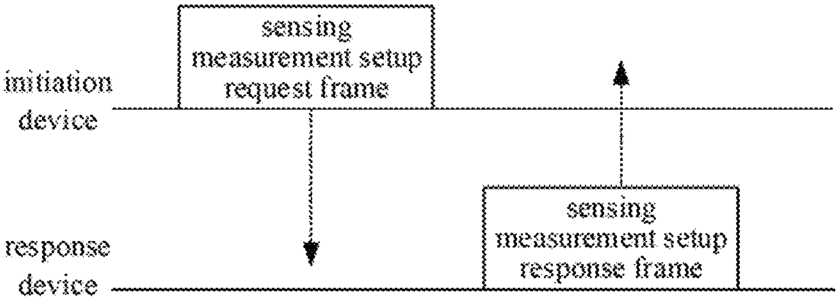
FIG. 8A, FIG. 8B, FIG. 8C and FIG. 8D are schematic diagrams of a Non-Trigger Based (Non-TB) measurement process.

As shown in FIG. 8A, processes of the Non-TB sensing measurement setup phase may include: an initiation device sends a sensing measurement setup request frame to a response device, and the response device returns a sensing measurement setup response frame to the initiation device.

Figure 8B:
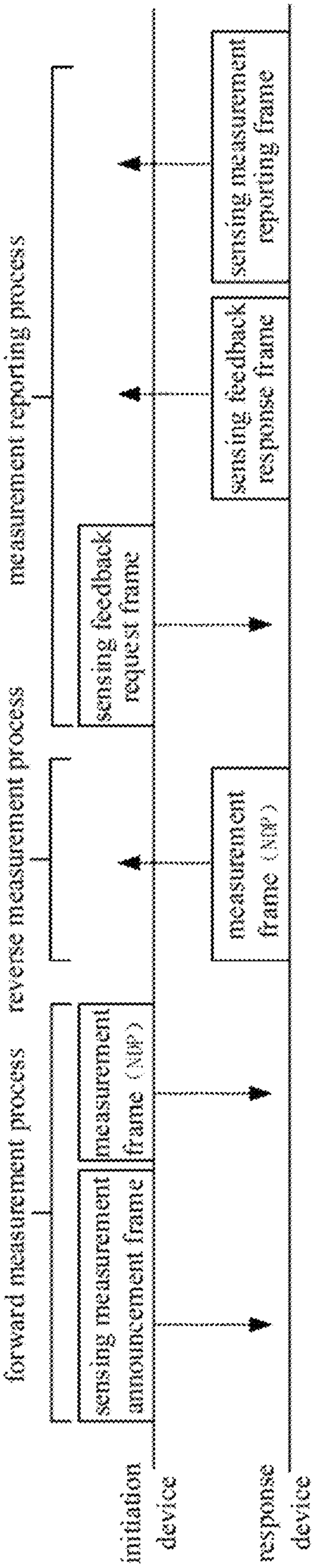

As shown in FIG. 8B, processes of a Non-TB bi-directional sensing measurement may include: in a forward measurement process, the initiation device sends a sensing measurement announcement frame and a measurement frame to the response device. In a reverse measurement process, the response device sends a measurement frame to the initiation device. In a measurement reporting process, the initiation device sends a sensing feedback request frame to the response device. The response device sends a sensing feedback response frame and a sensing measurement reporting frame to the initiation device.

Figure 8C:
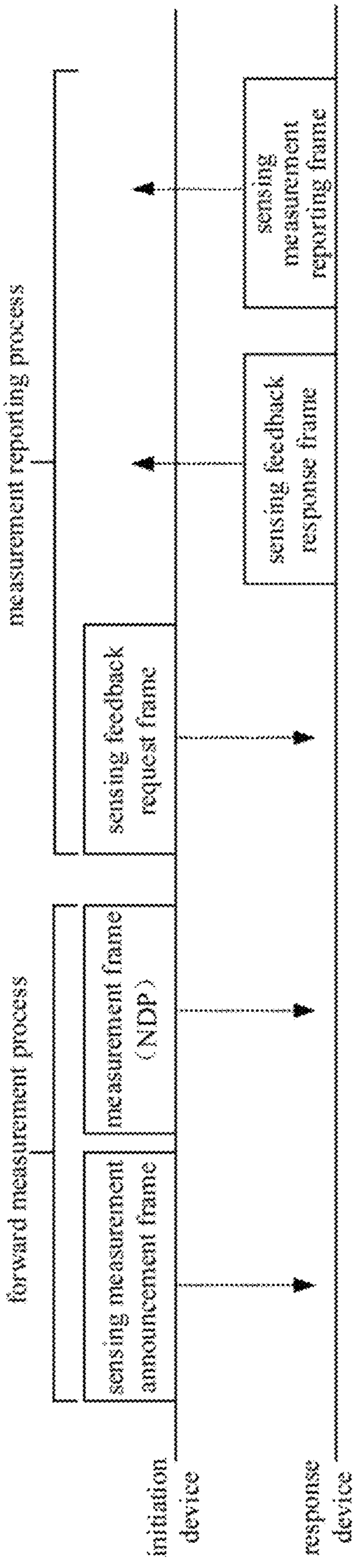

As shown in FIG. 8C, processes of a Non-TB forward sensing measurement may include: in a forward measurement process, the initiation device sends a sensing measurement announcement frame and a measurement frame to the response device. In a measurement reporting process, the initiation device sends a sensing feedback request frame to the response device. The response device sends a measurement frame to the initiation device. The response device sends a sensing feedback response frame and a sensing measurement reporting frame to the initiation device.

Figure 8D:
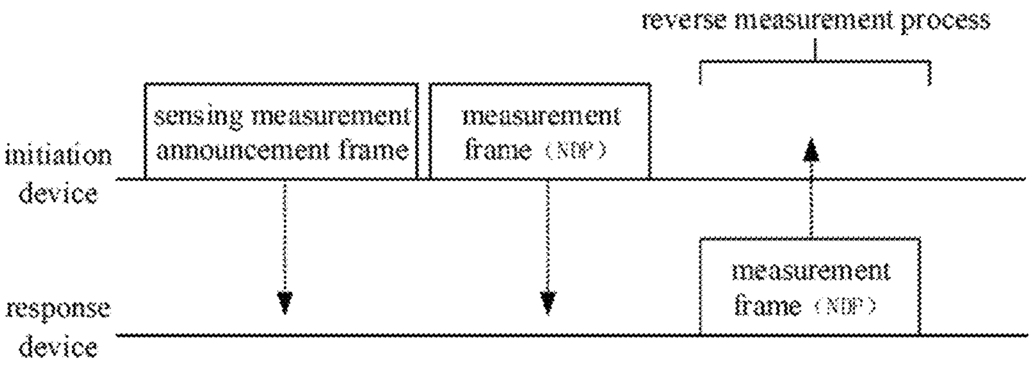

As shown in FIG. 8D, processes of a Non-TB reverse sensing measurement may include: the initiation device sends a sensing measurement announcement frame and a measurement frame to the response device. The response device sends a measurement frame to the initiation device. The response device sends a sensing feedback response frame and a sensing measurement reporting frame to the initiation device.

With respect to the TB sensing measurement methods in the above VI and VII points and the Non-TB sensing measurement method in the above VIII point, a specific frame format for information interaction may be provided based on the embodiments of the disclosure.

Figure 9:
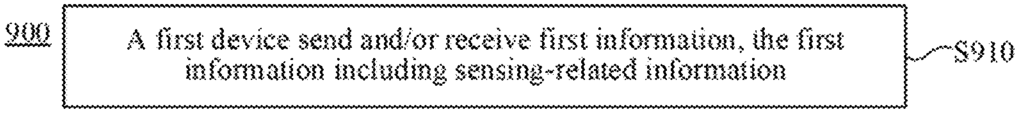
FIG. 9 is a schematic flowchart of a communication method according to an embodiment of the disclosure.

FIG. 9 is a schematic flowchart of a communication method 900 according to an embodiment of the disclosure. The method may optionally be applied to the system shown in FIG. 1, but is not limited thereto. The method includes at least a part of the following contents.

At S910, a first device sends and/or receives first information, the first information including sensing-related information.

Exemplarily, the first device is a sensing initiation device, and a second device is a sensing response device. If the first device sends the first information to the second device, a field for indicating a sensing measurement capability in the first information may specifically indicate a sensing measurement capability of the sensing initiation device, i.e., the first device. If the first device receives the first information from the second device, the field for indicating the sensing measurement capability in the first information may specifically indicate a sensing measurement capability of the sensing response device, i.e., the second device.

Exemplarily, the first device is a sensing response device, and a second device is a sensing initiation device. If the first device sends the first information to the second device, a field for indicating a sensing measurement capability in the first information may specifically indicate a sensing measurement capability of the sensing response device, i.e., the first device. If the first device receives the first information from the second device, the field for indicating the sensing measurement capability in the first information may specifically indicate a sensing measurement capability of the sensing initiation device, i.e., the second device.

In the embodiment of the disclosure, the first information may be used in a sensing capability discovery phase and/or a sensing measurement setup phase.

In a possible implementation, the first information includes sensing capability information. For example, the first information in the sensing capability discovery phase may be the sensing capability information.

In a possible implementation, the sensing capability information includes an extended capability element and/or a sensing capability element.

In a possible implementation, the extended capability element and/or the sensing capability element includes a field for indicating a sensing measurement capability. For example, an extended capability element in a frame of the discovery phase may be modified, so that the extended capability element includes the field for indicating the sensing measurement capability. For another example, a sensing capability element may be added to the frame of the discovery phase, so that the sensing capability element includes the field for indicating the sensing measurement capability.

In a possible implementation, the field for indicating the sensing measurement capability includes at least one of:

a field for indicating whether a Truncated Channel Impulse Response (TCIR) type is supported, for example, this field may specifically indicate whether the sensing initiation device or the sensing response device itself supports TCIR as the type of reported data;

a field for indicating whether a non-continuous TCIR is supported, for example, this field may specifically indicate whether the sensing initiation device or the sensing response device itself supports reporting segmented Channel Impulse Response (CIR) measurement data;

a field for indicating whether an enhanced Inverse Fourier Fast Transform (IFFT) is supported, for example, this field may specifically indicate whether the sensing initiation device or the sensing response device itself supports IFFT processing with an increased number of points;

a field for indicating a maximum IFFT enhancement factor, for example, this field may specifically indicate whether the sensing initiation device or the sensing response device itself supports a multiple of a highest number of points which may be supported by its own enhanced IFFT processing;

a field for indicating a maximum number of spatial streams sent in sensing, for example, this field may specifically indicate a maximum number of spatial streams which may be sent by the sensing initiation device or the sensing response device itself taking the role of a sending device in the sensing measurement;

a field for indicating a maximum number of Radio Frequency (RF) chains received in sensing, for example, this field may specifically indicate a maximum number of RF chains of the sensing measurement frame (such as NDP) which may be received by the sensing initiation device or the sensing response device itself taking the role of a receiving device in the sensing measurement;

a field for indicating whether beamforming is supported in sensing, for example, this field may specifically indicate whether the sensing initiation device or the sensing response device itself supports beamforming in a process of being used as a sensing sending device to send the sensing measurement frame (such as NDP) in the sensing measurement;

a field for indicating whether a basic coding mode is supported, for example, this field may specifically indicate whether the sensing initiation device or the sensing response device itself supports an amplitude coding mode, and the amplitude coding mode is used for CSI coding; furthermore, a subcarrier k in the amplitude coding mode is replaced by a delay t, so that it may also be used for TCIR coding;

a field for indicating whether a low-complexity coding mode is supported, for example, this field may specifically indicate whether the sensing initiation device or the sensing response device itself supports a certain predefined low-complexity amplitude coding mode, the low-complexity amplitude coding mode may be used for CSI coding; furthermore, a subcarrier k in the low-complexity amplitude coding mode is replaced by a delay t, so that it may also be used for TCIR coding;

a field for indicating whether a low-overhead coding mode is supported, for example, this field may specifically indicate whether the sensing initiation device or the sensing response device itself supports a certain predefined low-overhead amplitude coding mode, the low-overhead amplitude coding mode may be used for CSI coding; furthermore, a subcarrier k in the low-overhead amplitude coding mode is replaced by a delay t, so that it may also be used for TCIR coding;

a field for indicating whether aggregated reporting of sensing measurement results is supported, for example, this field may specifically indicate whether the sensing initiation device or the sensing response device itself supports a sensing measurement report, and the sensing measurement report may include measurement results from different measurement setups; or a field for indicating whether sensing by proxy is supported, for example, this field may specifically indicate whether the sensing initiation device or the sensing response device itself supports sensing by proxy.

In a possible implementation, the field for indicating the sensing measurement capability may further include:

a field for indicating whether a sensing sending role is supported, for example, this field may specifically be a field indicating whether the sensing initiation device or the sensing response device itself supports the sensing sending role;

a field for indicating whether a sensing receiving role is supported, for example, this field may specifically be a field indicating whether the sensing initiation device or the sensing response device itself supports the sensing receiving role;

a field for indicating whether TB sensing is supported, for example, this field may specifically indicate whether the sensing initiation device or the sensing response device itself supports a TB sensing measurement process;

a field for indicating whether Non-TB sensing is supported, for example, this field may specifically indicate whether the sensing initiation device or the sensing response device itself supports a Non-TB sensing measurement process;

a field for indicating whether a CSI type is supported, for example, this field may specifically indicate whether the sensing initiation device or the sensing response device itself supports CSI as the type of reported data;

a field for indicating whether a Received Signal Strength Indication (RSSI) type is supported, for example, this field may specifically indicate whether the sensing initiation device or the sensing response device itself supports RSSI as the type of reported data; and a field for indicating whether it is supported, for example, this field may specifically indicate whether the sensing initiation device or the sensing response device itself supports a beam Signal-to-Noise Ratio (Beam SNR) type of reported data.

Values of various fields for indicating whether the sensing initiation device or the sensing response device supports a certain sensing measurement capability may be 1 to represent 'yes', and may be 0 to represent 'no'; or, may be 0 to represent 'yes', and may be 1 to represent 'no'. Values of different fields representing 'yes' or 'no' may be the same or different. Of course, other numerical values may also be used to represent 'yes' or 'no', as long as they may be distinguished there-between, which is not limited in the embodiments of the disclosure.

In a possible implementation, a value of the field for indicating the maximum IFFT enhancement factor represents a first multiple, and a highest number of points supported by enhanced IFFT processing is the first multiple of a number of points supported by IFFT processing.

In a possible implementation, a value range of the first multiple includes a set of a finite number of positive integers.

In a possible implementation, the field for indicating the sensing measurement capability further includes at least one of: a field for indicating a maximum sensing bandwidth; or a field for indicating a maximum number of coding bits.

For example, the field for indicating the maximum sensing bandwidth may specifically indicate a maximum bandwidth supported by the sensing initiation device or the sensing response device itself in the sensing measurement. This field is an optional field. If this field is absent, the maximum sensing bandwidth of the device may be equal to a maximum communication bandwidth of the device by default.

For another example, the field for indicating the maximum number of coding bits may specifically indicate a maximum number of coding bits of the sensing initiation device or the sensing response device itself to a real part and imaginary part of reporting data.

In a possible implementation, the field for indicating the sensing measurement capability further includes at least one of:

a field for indicating a maximum number of spatial streams sent in sensing when a sensing bandwidth is less than or equal to a first bandwidth, for example, the first bandwidth is 80 MHz, and this field specifically indicates a maximum number of spatial streams which may be supported by the sensing initiation device or the sensing response device used as a sending device when the sensing bandwidth is less than or equal to 80 MHZ (20 MHz, 40 MHz or 80 MHZ);

a field for indicating a maximum number of spatial streams sent in sensing when the sensing bandwidth is equal to a second bandwidth, for example, the second bandwidth is 160 MHz, and this field specifically indicates a maximum number of spatial streams which may be supported by the sensing initiation device or the sensing response device used as a sending device when the sensing bandwidth is equal to 160 MHZ;

a field for indicating a maximum number of spatial streams sent in sensing when the sensing bandwidth is equal to a third bandwidth, for example, the third bandwidth is 320 MHz, and this field specifically indicates a maximum number of spatial streams which may be supported by the sensing initiation device or the sensing response device used as a sending device when the sensing bandwidth is equal to 320 MHZ;

a field for indicating a maximum number of RF chains received in sensing when the sensing bandwidth is less than or equal to the first bandwidth, for example, the first bandwidth is 80 MHz, and this field specifically indicates a maximum number of RF chains which may be supported by the sensing initiation device or the sensing response device used as a receiving device when the sensing bandwidth is less than or equal to 80 MHZ (20 MHZ, 40 MHz or 80 MHZ);

a field for indicating a maximum number of RF chains received in sensing when the sensing bandwidth is equal to the second bandwidth, for example, the second bandwidth is 160 MHz, and this field specifically indicates a maximum number of RF chains which may be supported by the sensing initiation device or the sensing response device used as a receiving device when the sensing bandwidth is equal to 160 MHz; or a field for indicating a maximum number of RF chains received in sensing when the sensing bandwidth is equal to the third bandwidth, for example, the third bandwidth is 320 MHz, and this field specifically indicates a maximum number of RF chains which may be supported by the sensing initiation device or the sensing response device used as a receiving device when the sensing bandwidth is equal to 320 MHZ.

In a possible implementation, an element ID field of the sensing capability element takes a value of 255, to indicate that the sensing capability element is an extended element. For example, the sensing capability element is added to one or more frames in the sensing capability discovery phase, and takes a value of 255, to indicate that the element is an extended element.

In a possible implementation, a value of a length field of the sensing capability element is a number of bytes of the sensing capability element except the element ID field and the length field. For example, if a total length of the sensing capability element is 10 bytes, a number of bytes of the element ID field is 2 bytes, and a number of bytes of the length field is 1 byte, then the value of the length field may be 7 bytes.

In a possible implementation, an element ID extension field of the sensing capability element takes any value in a range of 94~255. For example, the element ID extension field takes a value of 99, to indicate that the element is the sensing capability element.

In a possible implementation, the extended capability element and/or the sensing capability element is carried in at least one of a beacon frame, a probe request frame, a probe response frame, an association request frame, an association response frame, a reassociation request frame, or a reassociation response frame.

For example, the first device is an AP STA, and the second device is a non-AP STA. The first device sends at least one of the beacon frame, the probe response frame, the association response frame or the reassociation response frame to the second device. The first device receives at least one of the probe request frame, the association request frame or the reassociation request frame from the second device. Specifically, for example, the first device sends the beacon frame to the second device; the second device sends the probe request frame to the first device; the first device sends the probe response frame to the second device; the second device sends the association request frame to the first device; the first device sends the association response frame to the second device; the second device reassociates the probe request frame to the first device; the first device reassociates the probe response frame to the second device.

In a possible implementation, the first information includes sensing measurement setup information. For example, in the sensing measurement setup phase, the first information may be the sensing measurement setup information. The first information may be carried in the sensing measurement setup request frame and/or response frame.

In a possible implementation, an action domain field of the sensing measurement setup information includes a field for indicating sensing measurement setup. For example, this field may specifically indicate multiple measurement setup configured to implement WiFi sensing.

In a possible implementation, the field for indicating the sensing measurement setup includes at least one of:

- a field for indicating identity of a response device;
- a field for indicating a role of a sensing response device, for example, this field may specifically indicate the role of the response device in sensing;
- a field for indicating a sensing measurement type;
- a field for indicating a sensing bandwidth;
- a control domain field;
- a field for indicating punctured channel indication;
- a field for indicating a number of sent spatial streams;
- a field for indicating beamforming setup;
- a field for indicating a measurement result reporting limit;
- a field for indicating a type of reported data;
- a field for indicating a coding mode of the reported data;
- a field for indicating a number of coding bits of the reported data;
- a field for indicating a number of received RF chains;
- a field for indicating partial bandwidth feedback information;
- a field for indicating a grouping factor;
- a field for indicating an IFFT enhancement factor;
- a field for indicating measurement threshold setup; or
- a field for indicating sensing measurement timing.

In a possible implementation, the punctured channel indication may also be referred to as channel punctured information.

In a possible implementation, at least one of following fields is a mandatory field: the field for indicating the identity of the response device, the field for indicating the role of the sensing response device, the field for indicating the sensing measurement type, the field for indicating the sensing bandwidth, or the control domain field.

For example, the field for indicating the identity of the response device may specifically indicate ID of the sensing response device. For an associated STA, the ID may be an AID; for an unassociated STA, the ID may be a UID.

In a possible implementation, a value of the field for indicating the role of the sensing response device represents at least one of: both a sending device and a receiving device; the sending device; the receiving device; or other items. For example, the field for indicating the role of the sensing response device takes a value of 0, to represent that the sensing response device is both the sending device and the receiving device; takes a value of 1, to represent that the sensing response device is the sending device; takes a value of 2, to represent that the sensing response device is the receiving device; and takes a value of 3, to represent that the sensing response device has other roles.

In a possible implementation, the sensing measurement type includes a TB type and/or a Non-TB type. For example, if the field for indicating the sensing measurement type takes a value of 0, it indicates the TB type; if the field for indicating the sensing measurement type takes a value of 1, it indicates the Non-TB type.

In a possible implementation, a value of the field for indicating the sensing bandwidth represents at least one of 20 MHz, 40 MHZ, 80 MHZ, 160 MHZ, 320 MHz, or a reserved item. For example, the field for indicating the sensing bandwidth may specifically indicate a bandwidth of the sensing measurement frame sent and/or received by the response device in the sensing measurement process. Specifically, for example, if this field takes a value of 0, it indicates that the bandwidth is 20 MHZ; if this field takes a value of 1, it indicates that the bandwidth is 40 MHz; if this field takes a value of 2, it indicates that the bandwidth is 80 MHz; if this field takes a value of 3, it indicates that the bandwidth is 160 MHz; if this field takes a value of 4, it indicates that the bandwidth is 320 MHz; if this field takes other values, it represents that it is reserved.

In a possible implementation, the control domain field includes a field for indicating whether at least one of following fields is present:

- the field for indicating the sensing bandwidth;
- the field for indicating the punctured channel indication;
- the field for indicating the number of sent spatial streams;
- the field for indicating the beamforming setup;
- the field for indicating the type of reported data;
- the field for indicating the coding mode of the reported data;
- the field for indicating the number of coding bits of the reported data;
- the field for indicating the measurement result reporting limit;
- the field for indicating the partial bandwidth feedback information;
- the field for indicating the grouping factor;
- the field for indicating the IFFT enhancement factor;
- the field for indicating the measurement threshold setup; or
- the field for indicating the sensing measurement timing.

For example, a value of a presence/absence field, corresponding to the field for indicating the sensing bandwidth, in the control domain field may be set to 0 or 1, to represent whether the field for indicating the sensing bandwidth is present. It may be set to 0, to represent that the field for indicating the sensing bandwidth is absent, and it may be set to 1, to represent that the field for indicating the sensing bandwidth is present; or, it may be set to 0, to represent that the field for indicating the sensing bandwidth is present, and it may be set to 1, to represent that the field for indicating the sensing bandwidth is absent. Values of other fields in the control domain field are also similar, and are not elaborated here.

In a possible implementation, at least one of following fields is an optional field: the field for indicating the punctured channel indication, the field for indicating the number of sent spatial streams, the field for indicating the beamforming setup, the field for indicating the measurement result reporting limit, the field for indicating the type of reported data, the field for indicating the coding mode of the reported data, the field for indicating the number of coding bits of the reported data, the field for indicating the number of received RF chains, the field for indicating the partial bandwidth feedback information, the field for indicating the grouping factor, the field for indicating the IFFT enhancement factor, the field for indicating the measurement threshold setup, or the field for indicating the sensing measurement timing.

For example, the field for indicating the punctured channel indication may specifically indicate puncture conditions of Resource Unit (RU) in the sensing bandwidth used for sending and/or receiving a sensing NDP.

For another example, the field for indicating the number of sent spatial streams may specifically indicate a number of spatial streams used by the sensing response device to send the sensing NDP in the sensing measurement process.

In a possible implementation, a value of the field for indicating the beamforming setup represents at least one of: not using a beamforming steering matrix; using a fixed beamforming steering matrix; using a variable beamforming steering matrix; or a reserved item.

For example, the field for indicating the beamforming setup takes a value of 0, to represent that the beamforming steering matrix is not used; takes a value of 1, to represent that the fixed beamforming steering matrix is used; takes a value of 2, to represent that the variable beamforming steering matrix is used; and takes a value of 3, to represent that it is reserved.

In a possible implementation, not using the beamforming steering matrix represents that a sensing sending device does not use the beamforming steering matrix to send a sensing measurement frame, in sending different sensing measurement instances using a same sensing setup.

Using the fixed beamforming steering matrix represents that the sensing sending device uses the fixed beamforming steering matrix to send the sensing measurement frame, in different sensing measurement instances using the same sensing setup.

Using the variable beamforming steering matrix represents that the sensing sending device uses the variable beamforming steering matrix to send the sensing measurement frame, in different sensing measurement instances using the same sensing setup.

In a possible implementation, a value of the field for indicating the measurement result reporting limit represents at least one of: immediate reporting; delayed reporting of 1 sensing measurement instance; delayed reporting of 2 sensing measurement instances; delayed reporting of 3 sensing measurement instances; delayed reporting of 4 sensing measurement instances; or a reserved item.

For example, the field for indicating the measurement result reporting limit takes a value of 0, to represent immediate reporting; takes a value of 1, to represent delayed reporting of 1 sensing measurement instance; takes a value of 2, to represent delayed reporting of 2 sensing measurement instances; takes a value of 3, to represent delayed reporting of 3 sensing measurement instances; takes a value of 4, to represent delayed reporting of 4 sensing measurement instances; and takes other values, to represent that it is reserved.

In a possible implementation, a value of the field for indicating the type of reported data represents at least one of following types of the reported data: CSI; RSSI; Beam SNR; TCIR; TCIR_Padding; TCIR_Interpolation; TCIR_Splicing; or a reserved item.

For example, the field for indicating the type of reported data takes a value of 0, to represent that the type of reported data is CSI; takes a value of 1, to represent that the type of reported data is RSSI; takes a value of 2, to represent that the type of reported data is Beam SNR; takes a value of 3, to represent that the type of reported data is TCIR; takes a value of 4, to represent that the type of reported data is TCIR_Padding; takes a value of 5, to represent that the type of reported data is TCIR_Interpolation; takes a value of 6, to represent that the type of reported data is TCIR_Splicing; and takes a value of 7, to represent that it is reserved.

In a possible implementation, the type of reported data being CSI indicates that the sensing response device uses the CSI as the type of reported data.

In a possible implementation, the type of reported data of RSSI is for indicating that the sensing response device uses the RSSI as the type of reported data.

In a possible implementation, the type of reported data of Beam SNR is for indicating that the sensing response device uses the Beam SNR as the type of reported data.

In a possible implementation, the type of reported data of TCIR is for indicating that the sensing response device uses the TCIR as the type of reported data.

In a possible implementation, the type of reported data of TCIR_Padding is for instructing the sensing response device to perform operations of: padding CSI data points with a value of 0 at an end of measured N-point CSI original data, where a length of padded CSI data=N×IFFT enhancement factor; performing IFFT of (N×IFFT enhancement factor) points on the padded CSI data, to obtain CIR data of the (N×IFFT enhancement factor) points; and truncating a part of segments in the CIR data according to requirements of a sensing initiation device, and reporting resulting data.

In a possible implementation, the type of reported data TCIR_Interpolation is for instructing the sensing response device to perform operations of: interpolating a number (IFFT enhancement factor−1) of CSI data points after each data point of measured N-point CSI original data, where a length of interpolated CSI data=N×IFFT enhancement factor; performing IFFT of (N×IFFT enhancement factor) points on the interpolated CSI data, to obtain CIR data of the (N×IFFT enhancement factor) points; and truncating a part of segments in the CIR data according to requirements of a sensing initiation device, and reporting resulting data.

In a possible implementation, the type of reported data TCIR_Splicing is for instructing the sensing response device to perform operations of: splicing a number "IFFT enhancement factor" of N-point CSI original data into longer CSI data in an ascending order of frequencies, where a length after splicing is (N×IFFT enhancement factor) points; performing IFFT of the (N×IFFT enhancement factor) points on the spliced CSI data, to obtain CIR data of the (N×IFFT enhancement factor) points; and truncating a part of segments in the CIR data according to requirements of a sensing initiation device, and reporting resulting data.

In a possible implementation, a value of the field for indicating the coding mode of the reported data represents at least one of: a basic coding mode; a low-complexity coding mode; a low-overhead coding mode; or a reserved item. For example, the field for indicating the coding mode of the reported data takes a value of 0, to represent the basic coding mode; takes a value of 1, to represent the low-complexity coding mode; takes a value of 2, to represent the low-overhead coding mode; and takes a value of 3 or other values, to represent that it is reserved.

For example, the coding mode of the reported data is the basic coding mode, which may specifically indicate that the device itself supports a basic amplitude coding mode. The basic amplitude coding mode may be used for CSI coding. Furthermore, a subcarrier k in the basic amplitude coding mode is replaced by a delay t, so that it may be used for TCIR coding.

For another example, the coding mode of the reported data is the low-complexity coding mode, which may specifically indicate whether the device itself supports a predefined low-complexity amplitude coding mode. The low-complexity amplitude coding mode may be used for CSI coding. Furthermore, a subcarrier k in the low-complexity amplitude coding mode is replaced by a delay t, so that it may be used for TCIR coding.

For another example, the coding mode of the reported data is the low-overhead coding mode, which may specifically indicate whether the device itself supports a predefined low-overhead amplitude coding mode. The low-overhead amplitude coding mode may be used for CSI coding. Furthermore, a subcarrier k in the low-overhead amplitude coding mode is replaced by a delay t, so that it may be used for TCIR coding.

The field for indicating the coding mode of the reported data may be used in cooperation with the field for indicating the type of reported data. If the field for indicating the type of reported data represents that the reported data is frequency-domain data, the subcarrier k in the amplitude coding mode is used. If the field for indicating the type of reported data represents that the reported data is time-domain data, the delay t in the amplitude coding mode is used.

In a possible implementation, a value of the field for indicating the number of coding bits of the reported data represents at least one of 8, 9, 10, 11, 12, 13, 14, or a reserved item. For example, the field for indicating the number of coding bits of the reported data takes a value of 0, to represent that the number of coding bits of the reported data is 8 bits; takes a value of 1, to represent that the number of coding bits of the reported data is 9 bits; takes a value of 2, to represent that the number of coding bits of the reported data is 10 bits; takes a value of 3, to represent that the number of coding bits of the reported data is 11 bits; takes a value of 4, to represent that the number of coding bits of the reported data is 12 bits; takes a value of 5, to represent that the number of coding bits of the reported data is 13 bits; takes a value of 6, to represent that the number of coding bits of the reported data is 14 bits; and takes other values, to represent that it is reserved.

In a possible implementation, the field for indicating the number of received RF chains may specifically indicate a number of RF chains used by the sensing response device to receive the sensing NDP in the sensing measurement process, or may indicate a number of RF chains to be reported later.

In a possible implementation, the field for indicating the partial bandwidth feedback information includes at least one of: a field for indicating resolution; or a field for indicating a feedback bitmap. For example, the field for indicating the partial bandwidth feedback information may specifically indicate a frequency range in which a sensing receiving device reports sensing measurement result data to the sensing sending device. The field for indicating resolution and included in this field may indicate a unit bandwidth represented by each bit in the field for indicating the feedback bitmap. The field for indicating the feedback bitmap may indicate a request situation of each unit bandwidth from a lowest frequency to a highest frequency.

In a possible implementation, a value of the field for indicating the grouping factor represents at least one of 1, 2, 4, 8, or a reserved item. For example, the field for indicating the grouping factor may specifically indicate a grouping factor used by the sensing response device to report a measurement result of the data type. This field takes a value of 0, to represent that the grouping factor is 1; takes a value of 1, to represent that the grouping factor is 2; takes a value of 2, to represent that the grouping factor is 4; takes a value of 3, to represent that the grouping factor is 8; and takes values of 4~7, to represent that the grouping factor is reserved.

In a possible implementation, a value of the field for indicating the IFFT enhancement factor represents a second multiple, and a length of CSI data after being processed by at least one of padding, interpolation or splicing is the second multiple of a length of original CSI data. For example, the field for indicating the IFFT enhancement factor may specifically indicate an IFFT enhancement factor used by the response device to report measurement results of data types TCIR_Padding, TCIR_Interpolation, and TCIR_Splicing.

In a possible implementation, the second multiple includes at least one of 1, 2, 4, or a reserved item. For example, the field for indicating the IFFT enhancement factor takes a value of 0, to represent that the second multiple indicated by the IFFT enhancement factor is 1; takes a value of 1, to represent that the second multiple indicated by the IFFT enhancement factor is 2; takes a value of 3, to represent that the second multiple indicated by the IFFT enhancement factor is 4; takes a value of 4, to represent that the second multiple indicated by the IFFT enhancement factor is 8; and takes values of 4~7, to represent that the second multiple indicated by the IFFT enhancement factor is reserved.

In a possible implementation, a value of the field for indicating the measurement threshold setup represents at least one of: not using threshold-based measurement reporting; reporting only when measurement result variation exceeds a set threshold; or a reserved item.

In a possible implementation, a range of the set threshold is greater than 0 and less than 100%. For example, the field for indicating the measurement threshold setup takes a value of 0, to represent that the threshold-based measurement reporting is not used; takes values of 1~20 respectively, to represent that reporting is made only when the measurement result variation exceeds a certain set threshold; and takes other values, to represent that it is reserved.

For another example, the measurement result variation=(the current measurement result−the previous measurement result)/the previous measurement result×100%. If the value of the field for indicating the measurement threshold setup represents that reporting is made only when the measurement result variation exceeds 5%, and the measurement result variation=6%, then it is determined that reporting may be made.

In a possible implementation, the field for indicating the sensing measurement timing may inform the sensing response device of time scheduling of the sensing measurement.

In a possible implementation, the field for indicating the sensing measurement timing includes at least one of:

- a field for indicating a sensing measurement start time, for example, this field may specifically indicate a value of Time Synchronization Function (TSF) at a start moment of a first sensing measurement instance;
- a field for indicating a period of a sensing measurement instance, for example, this field may specifically indicate a period during which a sensing measurement instance appears repeatedly; or
- a field for indicating a duration of the sensing measurement instance, for example, this field may specifically indicate duration of one sensing measurement instance.

In a possible implementation, the field for indicating the period of the sensing measurement instance includes at least one of:

- a field for indicating a period unit of the sensing measurement instance, for example, this field may specifically indicate a size of a unit time; or
- a field for indicating a period value of the sensing measurement instance, for example, this field may specifically indicate a size of the period of the sensing measurement instance, and a unit thereof is the period unit of the sensing measurement instance.

In a possible implementation, a value of the field for indicating the period unit of the sensing measurement instance represents at least one of 1 ms or 10 ms. For example, this field takes a value of 0, to represent that the period unit of the sensing measurement instance is 1 ms; and takes a value of 1, to represent that the period unit of the sensing measurement instance is 10 ms.

In a possible implementation, the field for indicating the duration of the sensing measurement instance includes at least one of:

a field for indicating a duration unit of the sensing measurement instance, for example, this field may specifically indicate a size of a unit time; or a field for indicating a duration value of the sensing measurement instance, for example, this field may specifically indicate a size of the duration of the sensing measurement instance, and a unit thereof is the duration unit of the sensing measurement instance.

In a possible implementation, a value of the field for indicating the duration unit of the sensing measurement instance represents at least one of 1 ms or 10 ms. For example, this field takes a value of 0, to represent that the duration unit of the sensing measurement instance is 1 ms; and takes a value of 1, to represent that the duration unit of the sensing measurement instance is 10 ms.

In a possible implementation, a mode of calculating the field for indicating the duration value of the sensing measurement instance includes: the duration of the sensing measurement instance=the duration unit of the sensing measurement instance×the duration value of the sensing measurement instance.

In a possible implementation, the sensing measurement setup information including the field for indicating the sensing measurement setup may be carried by a sensing request frame.

In a possible implementation, the sensing request frame is a sensing measurement setup request frame.

Exemplarily, existence of various subfields in the sensing measurement setup field of the sensing measurement setup request frame has a certain constraint relationship.

For example, a value of the field for indicating the role of the sensing response device represents that the sensing response device is a sensing sending device, the field for indicating the number of sent spatial streams and the field for indicating the beamforming setup are present in the sensing measurement setup request frame, the field for indicating the punctured channel indication and the field for indicating the sensing measurement timing may be present in the sensing measurement setup request frame, and other optional fields are not present in the sensing measurement setup request frame.

For another example, the value of the field for indicating the role of the sensing response device represents that the sensing response device is a sensing receiving device; the field for indicating the measurement result reporting limit, the field for indicating the type of reported data, the field for indicating the coding mode of the reported data, the field for indicating the number of coding bits of the reported data, the field for indicating the number of received RF chains, the field for indicating the partial bandwidth feedback information, the field for indicating the measurement threshold setup, the field for indicating the sensing measurement timing are present in the sensing measurement setup request frame, the field for indicating the grouping factor and the field for indicating the IFFT enhancement factor may be present in the sensing measurement setup request frame, and other optional fields are not present in the sensing measurement setup request frame.

For another example, the value of the field for indicating the role of the sensing response device represents that the sensing response device is both a sending device and a receiving device; the field for indicating the number of sent spatial streams, the field for indicating the beamforming setup, the field for indicating the measurement result reporting limit, the field for indicating the type of reported data, the field for indicating the coding mode of the reported data, the field for indicating the number of coding bits of the reported data, the field for indicating the number of received RF chains, the field for indicating the partial bandwidth feedback information, the field for indicating the sensing measurement timing are present in the sensing measurement setup request frame; the field for indicating the punctured channel indication, the field for indicating the measurement threshold setup, the field for indicating the grouping factor, the field for indicating the IFFT enhancement factor may be present in the sensing measurement setup request frame.

For another example, the value of the field for indicating the role of the sensing response device represents that the sensing response device is a sensing sending device; if the field for indicating the sensing bandwidth is 320 MHZ, the field for indicating the punctured channel indication is present; if the field for indicating the sensing bandwidth is less than 320 MHz, the field for indicating the punctured channel indication is not present.

For another example, if the field for indicating the type of reported data is TCIR_Padding, TCIR_Interpolation or TCIR_Splicing, the field for indicating the IFFT enhancement factor is present. If the field for indicating the type of reported data is not TCIR_Padding, TCIR_Interpolation and TCIR_Splicing, the field for indicating the IFFT enhancement factor is not present.

In a possible implementation, the sensing measurement setup information includes a field for indicating a status code.

In a possible implementation, failure reasons represented by a value of the field for indicating the status code include at least one of: not meeting a measurement result reporting time limit; low battery level; or communication services are busy.

For example, the field for indicating the status code takes a value of 130, to represent that the sensing measurement setup has failed, and the failure reason is that the measurement result reporting time limit cannot be met; takes a value of 131, to represent that the sensing measurement setup has failed, and the failure reason is the low battery level; and takes a value of 132, to represent that the sensing measurement setup has failed, and the failure reason is the busy communication service.

In a possible implementation, the sensing measurement setup information including the field for indicating the status code may be carried by a sensing response frame.

In a possible implementation, the sensing response frame is a sensing measurement setup response frame.

In a possible implementation, the action domain field of the sensing measurement setup information further includes at least one of:

a field to indicate an action category;

a field for indicating a public action subtype;

a field for indicating a session token;

a field for indicating a sensing subtype;

a field for indicating a sensing measurement setup command; or a field to indicate a sensing measurement setup ID.

For example, the field for indicating the sensing subtype may use any value in a range of 0~255. For example, this field takes a value of 0, to represent a sensing session setup request frame; takes a value of 1, to represent a sensing session setup response frame; takes a value of 2, to represent the sensing measurement setup request frame; takes a value of 3, to represent the sensing measurement setup response frame; and takes values of 4~15, to represent that it is reserved.

Various fields included in the above field for indicating the sensing measurement setup take values of 0, 1, 2, 3, etc., to correspond to different meanings respectively, which are only examples, rather than limitations. In an actual application, the above various fields may also take other values, which are not limited in the embodiments of the disclosure.

In a possible implementation, the first device is a sensing initiation device, and the operation of sending and/or receiving, by the first device, the first information includes the following operations. The sensing initiation device sends a sensing request frame carrying the sensing measurement setup information.

In a possible implementation, the operation of sending and/or receiving, by the first device, the first information further includes the following operations. The sensing initiation device receives the sensing request frame carrying the sensing measurement setup information.

In a possible implementation, the first device is a sensing response device, and the operation of sending and/or receiving, by the first device, the first information includes the following operations. The sensing response device receives a sensing response frame carrying the sensing measurement setup information.

In a possible implementation, the operation of sending and/or receiving, by the first device, the first information further includes the following operations. The sensing response device sends the sensing request frame carrying the sensing measurement setup information.

The embodiments of the disclosure propose a frame format used in the sensing capability discovery phase in WiFi sensing, and add information fields required to implement functions such as variable number of feedback spatial streams, variable type of reported data, variable coding mode of the reported data, variable number of coding bits of the reported data, enhanced IFFT, or the like in WiFi sensing.

The embodiments of the disclosure also propose a frame format used in the sensing measurement setup phase in WiFi sensing, and add information fields required to implement functions such as punctured channel, variable number of feedback spatial streams, variable type of reported data, variable coding mode of the reported data, variable number of coding bits of the reported data, delayed reporting of measurement results, partial bandwidth feedback, threshold measurement reporting, enhanced IFFT, or the like in WiFi sensing.

For example, the functions of punctured channel, variable number of feedback spatial streams, and partial bandwidth feedback supported by the above frame format may allow a volume of sensing measurement result data reported by the sensing response device to be more flexible, and the sensing initiation device may request the sensing response device to report result data in any specific range.

For another example, the function of variable type of reported data supported by the above frame format may meet requirements of more different sensing applications, and set the type of reported data of the sensing response device according to requirements of the applications.

For another example, the function of delayed reporting of measurement results supported by the above frame format may greatly relieve pressure of the sensing response device in processing and reporting measurement result data, it is more friendly to some devices with limited computing/storage resources, and is easy to reduce manufacturing cost of the sensing device.

For another example, the above frame format supports selection of multiple coding modes of the reported data, so that coding modes may be selected for different scenarios.

Therefore, the embodiments of the disclosure may support the wireless network to implement richer communication functions, and are closer to a development trend of formulating wireless network standards such as 802.11bf standard.

Frame formats provided in the embodiments of the disclosure are introduced below through specific examples.

With reference to FIG. 3A, the overall process of WiFi sensing may include five phases, i.e., Discovery, Setup, Measurement, Reporting and Teardown. The frame formats provided in the embodiments of the disclosure mainly involve two phases, i.e., Discovery and Setup. The frame formats provided by the disclosure in the two phases are described below respectively.

1. Sensing Capability Discovery Phase 1.1 Extended Capability Element

In the discovery phase, several fields for indicating specific sensing measurement capabilities (shown in the dashed box) are added to the extended capability element (as shown in FIG. 10).

First scheme: fields in the extended capability element include:

(1) Whether a sensing sending role is supported: indicating whether the device itself supports that it takes the role of the sensing sending device. Exemplarily, 1 represents yes, 0 represents no; or, 0 represents yes, 1 represents no.

(2) Whether a sensing receiving role is supported: indicating whether the device itself supports that it takes the role of the sensing receiving device. Exemplarily, 1 represents yes, 0 represents no; or, 0 represents yes, 1 represents no.

(3) Whether TB sensing is supported: indicating whether the device itself supports a TB sensing measurement process. Exemplarily, 1 represents yes, 0 represents no; or, 0 represents yes, 1 represents no.

(4) Whether Non-TB sensing is supported: indicating whether the device itself supports a Non-TB sensing measurement process. Exemplarily, 1 represents yes, 0 represents no; or, 0 represents yes, 1 represents no.

(5) Whether a CSI type is supported: indicating whether the device itself supports reporting CSI defined in the 802.11n protocol for example as the type of reported data. Exemplarily, 1 represents yes, 0 represents no; or, 0 represents yes, 1 represents no.

(6) Whether an RSSI type is supported: indicating whether the device itself supports reporting RSSI defined in the 802.11n protocol for example as the type of reported data. Exemplarily, 1 represents yes, 0 represents no; or, 0 represents yes, 1 represents no.

(7) Whether a Beam SNR type is supported: indicating whether the device itself supports reporting Beam SNR defined in the 802.11n protocol for example as the type of reported data. Exemplarily, 1 represents yes, 0 represents no; or, 0 represents yes, 1 represents no.

(8) Whether a TCIR type is supported: indicating whether the device itself supports reporting TCIR as the type of reported data. Exemplarily, 1 represents yes, 0 represents no; or, 0 represents yes, 1 represents no.

An example of the TCIR type may include: first, an IFFT operation is performed on CSI data with a length of N points, to obtain CIR data with a length of N points; then, the CIR data is truncated according to requirements of the sensing initiation device, and CIR data of M (M≤N) points is kept, and the CIR data of M points is TCIR data.

(9) Whether a non-continuous TCIR is supported: indicating whether the device itself supports reporting segmented CIR measurement data. Exemplarily, 1 represents yes, 0 represents no; or, 0 represents yes, 1 represents no.

(10) Whether an enhanced IFFT is supported: indicating whether the device itself supports IFFT processing with increased points. Exemplarily, 1 represents yes, 0 represents no; or, 0 represents yes, 1 represents no.

(11) Maximum IFFT enhancement factor: indicating a multiple of a number of points supported by IFFT processing that is compared to a highest number of points supported by enhanced IFFT processing of the device itself. A value range of the IFFT enhancement factor is a set of a finite number of positive integers, such as {1, 2, 4}. If the maximum IFFT enhancement factor field takes a value of 2, it indicates that the device supports IFFT enhancement factors with values of {1, 2}.

(12) Maximum number of spatial streams sent in sensing: indicating a maximum number of spatial streams which may be sent by the device itself taking the role of the sending device in the sensing measurement, such as 1~16 spatial streams.

(13) Maximum number of RF chains received in sensing: indicating a maximum number of RF chains which may be used by the device itself taking the role of the receiving device to receive the NDP in the sensing measurement, such as 1~16 RF chains.

(14) Maximum sensing bandwidth: this field is an optional field. When this field appears, it indicates a maximum bandwidth supported by the device itself in the sensing measurement. Exemplarily, 0 represents 20 MHz, 1 represents 40 MHZ, 2 represents 80 MHz, 3 represents 160 MHz, 4 represents 320 MHz, and 5~15 are reserved. Values used in this field are only an exemplary introduction, and this field may also be set to other values, as long as it is ensured that the value corresponding to each bandwidth is different from values corresponding to other bandwidths. When this field does not appear, the maximum sensing bandwidth of the device is equal to a maximum communication bandwidth of the device by default. The maximum communication bandwidth may be obtained from other relevant elements, for example, a maximum communication bandwidth of an Extremely High Throughput (EHT) device may be obtained from a 'Supported Channel Width Set' field in a High Efficiency (HE) capability element and a 'Support For 320 MHz In 6 GHz' field in an EHT capability element.

(15) Maximum number of coding bits: indicating a maximum number of coding bits of the device itself to a real part and imaginary part of reporting data, such as [8, 14] bits.

(16) Whether beamforming is supported in sensing: indicating whether the device itself supports beamforming in a process of being used as a sensing sending device to send the NDP in the sensing measurement.

(17) Whether a basic coding mode is supported: indicating whether the device itself supports for example an amplitude coding mode defined in the 802.11n protocol. For example, the device may support the amplitude coding mode defined in the 802.11n protocol to be used for CSI coding; furthermore, a subcarrier k in the amplitude coding mode defined in the 802.11n protocol is replaced by a delay t, so that it may be used for TCIR coding.

(18) Whether a low-complexity coding mode is supported: indicating whether the device itself supports a predefined low-complexity amplitude coding mode, such as a predetermined low-complexity amplitude coding mode. The predefined low-complexity amplitude coding mode may be used for CSI coding, and a subcarrier k in the predefined amplitude coding mode is replaced by a delay t, so that it may be used for TCIR coding.

(19) Whether a low-overhead coding mode is supported: indicating whether the device itself supports a predefined low-overhead amplitude coding mode, such as a predefined low-overhead amplitude coding mode. The predefined low-overhead amplitude coding mode is used for CSI coding, and a subcarrier k in the predefined low-overhead amplitude coding mode is replaced by a delay t, so that it may be used for TCIR coding.

(20) Whether aggregated reporting of sensing measurement results is supported: indicating whether the device itself supports one sensing measurement report to include measurement results from different measurement setups, such as a predefined sensing measurement reporting mode. 1 represents yes, 0 represents no; or, 0 represents yes, 1 represents no.

An example of aggregated reporting of sensing measurement results may include: reporting, in one sensing measurement reporting frame, measurement results of measurement instances from different measurement setups is supported, which may save communication overhead in a process of reporting the measurement results.

(21) Whether sensing by proxy is supported: indicating whether the device itself supports sensing by proxy, such as a predefined sensing mode by proxy. 1 represents yes, 0 represents no; or, 0 represents yes, 1 represents no.

An example of sensing by proxy may include: the STA entrusts the AP to replace it to be used as the sensing initiation device, to perform sensing setup, sensing measurement, sensing reporting and other operations; finally, the entrusted AP sends measured result data to the STA.

Figure 11:
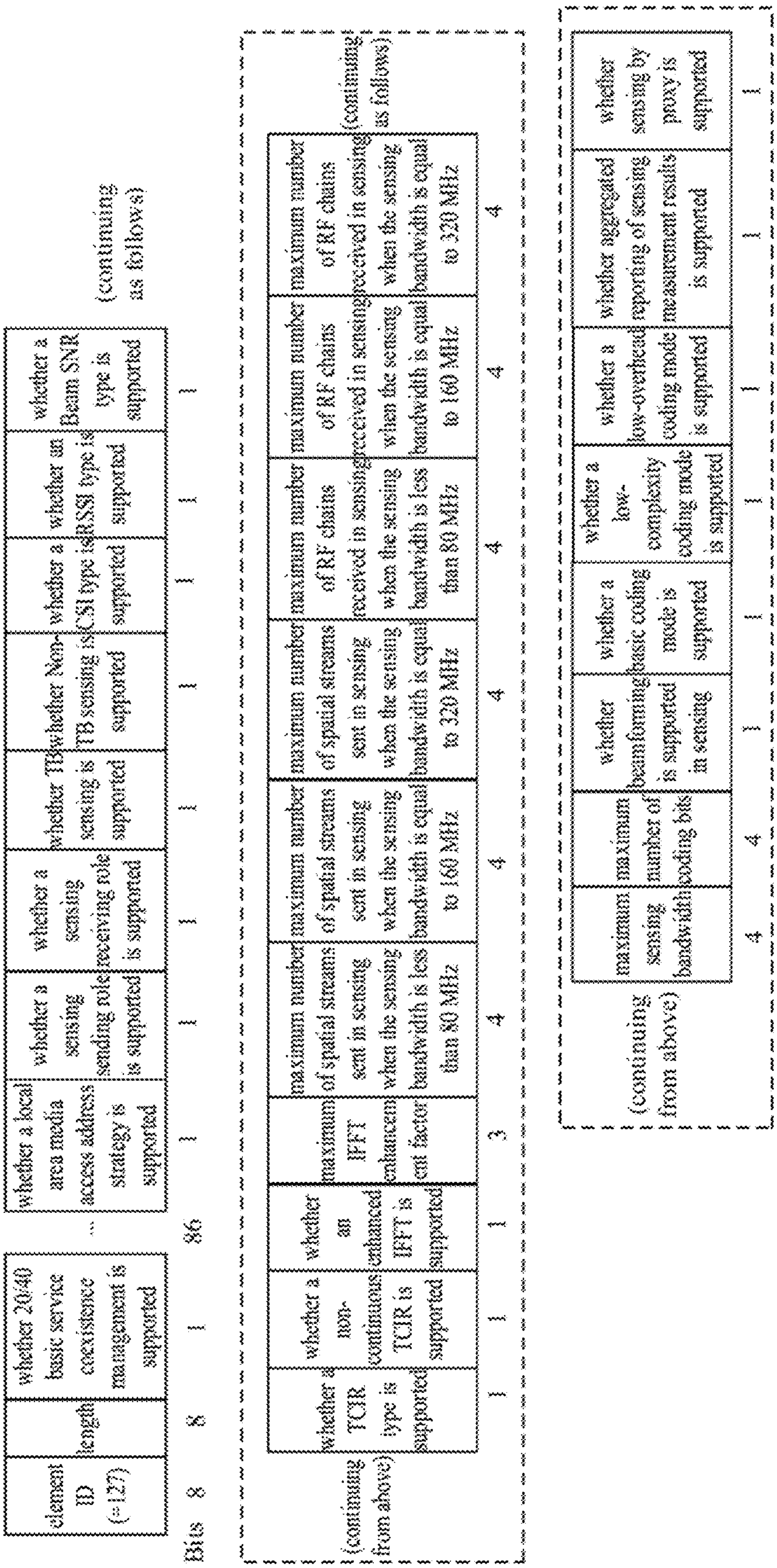
FIG. 11 is a schematic diagram of a second scheme of extending a capability element.

Second scheme: another embodiment of the extended capability element is shown in FIG. 11. In the scheme, (12) maximum number of spatial streams sent in sensing and (13) maximum number of RF chains received in sensing in the first scheme shown in FIG. 10 may be replaced by the following fields (12-1) to (13-3).

(12-1) Maximum number of spatial streams sent in sensing when the sensing bandwidth≤80 MHz: indicating a maximum number of spatial streams which may be supported by the sending device when the sensing bandwidth is less than or equal to 80 MHz (20 MHz, 40 MHz or 80 MHZ).

(12-2) Maximum number of spatial streams sent in sensing when the sensing bandwidth=160 MHz: indicating a maximum number of spatial streams which may be supported by the sending device when the sensing bandwidth is equal to 160 MHZ.

(12-3) Maximum number of spatial streams sent in sensing when the sensing bandwidth=320 MHz: indicating a maximum number of spatial streams which may be supported by the sending device when the sensing bandwidth is equal to 320 MHZ.

(13-1) Maximum number of RF chains received in sensing when the sensing bandwidth≤80 MHz: indicating a maximum number of RF chains which may be supported by the receiving device when the sensing bandwidth is less than or equal to 80 MHZ (20 MHz, 40 MHz or 80 MHZ).

(13-2) Maximum number of RF chains received in sensing when the sensing bandwidth=160 MHz: indicating a maximum number of RF chains which may be supported by the receiving device when the sensing bandwidth is equal to 160 MHZ.

(13-3) Maximum number of RF chains received in sensing when the sensing bandwidth=320 MHz: indicating a maximum number of RF chains which may be supported by the receiving device when the sensing bandwidth is equal to 320 MHZ.

Meanings of other fields may refer to meanings of corresponding fields in FIG. 10.

The extended capability element may be carried in at least one of a beacon frame (Beacon), a probe request frame (Probe Request), a probe response frame (Probe Response), an association request frame (Association Request), an association response frame (Association Response), a reassociation request frame (Reassociation Request), or a reassociation response frame (Reassociation Response).

1.2 Sensing Capability Element

The embodiments of the disclosure may use a new sensing capability element.

Figure 12:
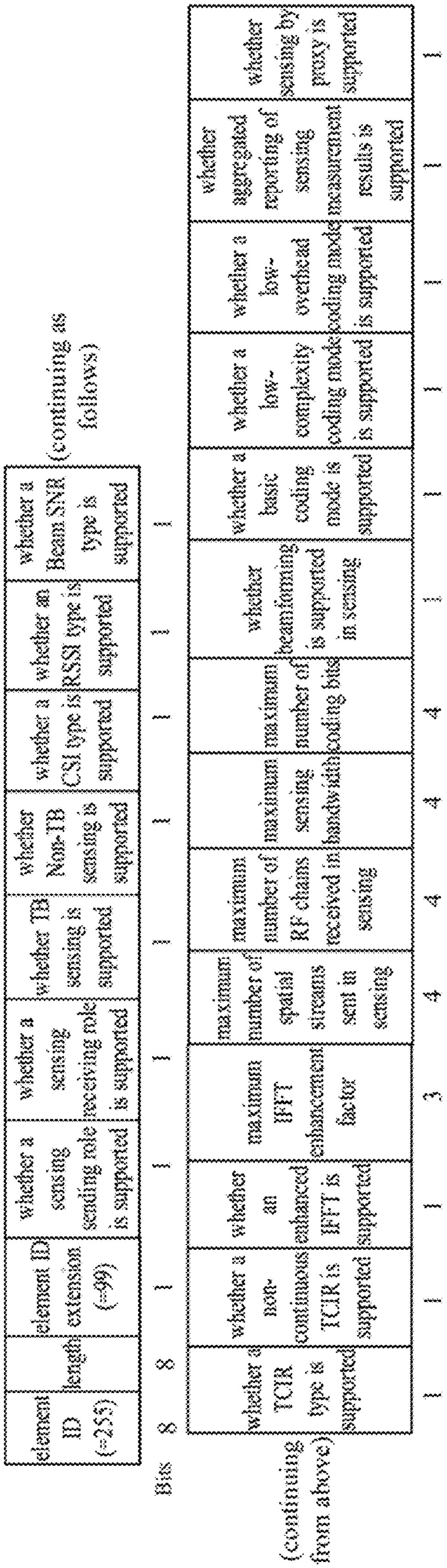
FIG. 12 is a schematic diagram of a first scheme of sensing a capability element.

First scheme: as shown in FIG. 12, one kind of sensing capability element may include:

Element ID: taking a value of 255, to indicate that the element is an extension element.

Length: a value of which is a number of bytes of the sensing capability element except the element ID field and the length field.

Element ID extension: taking a value of 99 (any value in a range of 94~255 may be used), to indicate that the element is a sensing capability element.

Other fields may refer to relevant descriptions of corresponding fields in FIG. 10, which are not elaborated herein.

Second scheme: as shown in FIG. 13, another example of the sensing capability element may include:

Element ID: taking a value of 255, to indicate that the element is an extension element.

Length: a value of which is a number of bytes of the sensing capability element except the element ID field and the length field.

Element ID extension: taking a value of 99 (any value in a range of 94~255 may be used), to indicate that the element is a sensing capability element.

Other fields may refer to relevant descriptions of corresponding fields in FIG. 11, which are not elaborated herein.

The above sensing capability element may be carried in at least one of a beacon frame (Beacon), a probe request frame (Probe Request), a probe response frame (Probe Response), an association request frame (Association Request), an association response frame (Association Response), a reassociation request frame (Reassociation Request), or a reassociation response frame (Reassociation Response).

2. Sensing Measurement Setup Phase

In the setup phase, there are provided two formats of frames, i.e., a sensing measurement setup request frame and a sensing measurement setup response frame. Contents of these two formats of frames are described in detail below respectively.

2.1 Sensing Measurement Setup Request Frame

Figure 14:
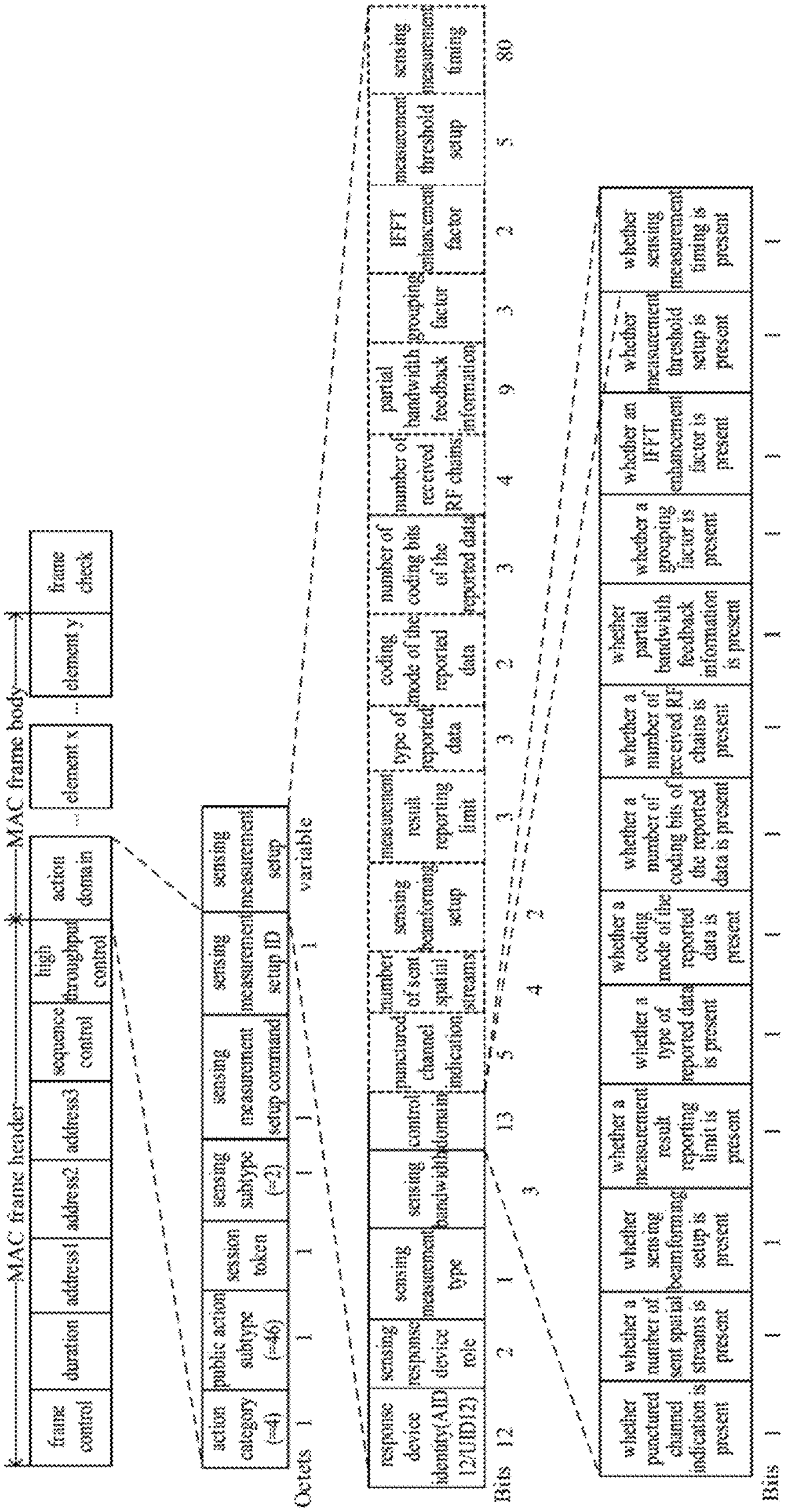
FIG. 14 is a schematic diagram of a sensing measurement setup request frame.

As shown in FIG. 14, there is provided a sensing action frame, which is a new action frame or an action no acknowledgement (Action No Ack) frame.

(1) Action category (Category): taking a value of 4, to represent that the frame is a public action frame.

(2) Public action subtype (Public Action Field): taking a value of 46, to represent that the frame is a sensing action frame (any value in a range of 46~255 may be used, to represent that the frame is a sensing action frame).

(3) Session token.

(4) Sensing subtype: taking a value of 2 (any value in a range of 0~255 may be used), to indicate the sensing measurement setup request frame.

The sensing subtype field takes a value of 0, to represent a sensing session setup request frame; takes a value of 1, to represent a sensing session setup response frame; takes a value of 2, to represent the sensing measurement setup request frame; takes a value of 3, to represent the sensing measurement setup response frame; and takes values of 4~15, to represent that it is reserved. Values used in this field are only an exemplary introduction, and this field may also be set to other values, as long as it is ensured that the value corresponding to each sensing subtype is different from values corresponding to other sensing subtypes.

(5) Sensing measurement setup command (Setup Command): taking a value of 0, to represent 'Demand'; taking a value of 1, to represent 'Suggest'; and taking values of 2~255, to represent that it is reserved.

(6) Sensing measurement setup ID: indicating an identity ID of a set of measurement setups configured to implement WiFi sensing, and taking an integer in a range of [0, 255]; there may be multiple but non-repetitive measurement setup IDs between any two devices.

(7) Sensing measurement setup: indicating a set of measurement setups configured to implement WiFi sensing, and including 5 mandatory fields and 13 optional fields.

(7-1) Response device identity (AID12/UID12): (a mandatory field) indicating ID of the sensing response device (Responder), which is an AID for the associated STA, and is a UID for the unassociated STA (the UID is allocated by the AP, and an allocated space for the UID is consistent with that for the AID), and takes a value of 0, to represent an AID of the associated AP.

(7-2) Sensing response device role: (a mandatory field) indicating a role of the response device in the sensing, its values and meanings are shown in Table 1.

TABLE 1

Meanings of the "response device role" field

| value | role of response device |
|---|---|
| 0 | Both a sending device and a receiving device |
| 1 | sending device |
| 2 | receiving device |
| 3 | other items |

(7-3) Sensing measurement type: (a mandatory field) indicating the type of sensing measurement, taking a value of 0 to indicate the TB type, and taking a value of 1 to indicate the Non-TB type.

(7-4) Sensing bandwidth: (a mandatory field) indicating the bandwidth of the sensing measurement frame (such as NDP) sent and/or received by the response device in the sensing measurement process. Its values and meanings are shown in Table 2. Values used in this field are only an exemplary introduction, and this field may also be set to other values, as long as it is ensured that the value corresponding to each bandwidth is different from values corresponding to other bandwidths.

TABLE 2

Meanings of the "sensing bandwidth" field

| value | bandwidth |
|---|---|
| 0 | 20 MHz |
| 1 | 40 MHZ |
| 2 | 80 MHZ |

TABLE 2-continued

Meanings of the "sensing bandwidth" field

| value | bandwidth |
|---|---|
| 3 | 160 MHZ |
| 4 | 320 MHz |
| other | reserved |

(7-5) Control domain: (a mandatory field) indicating whether at least one of following fields is present: sensing bandwidth, punctured channel indication, number of sent spatial streams, beamforming setup, type of reported data, coding mode of the reported data, number of coding bits of the reported data, measurement result reporting limit, partial bandwidth feedback information, grouping factor, IFFT enhancement factor, measurement threshold setup, or sensing measurement timing. For example, 1 represents yes, 0 represents no; or, 0 represents yes, 1 represents no.

(7-6) Punctured channel indication: (an optional field) indicating puncture conditions of RU in the sensing bandwidth used for sending and/or receiving a sensing NDP. An example of specific contents of the punctured channel indication may are shown in Table 3.

TABLE 3

Values and meanings of the "punctured channel indication" field

| sensing bandwidth | puncture conditions | puncture mode | value |
|---|---|---|---|
| 20 MHZ | no puncture | [1 1 1 1] (242-tone RU 1) | 0 |
| 40 MHZ | no puncture | [1 1 1 1] (484-tone RU 1) | 0 |
| 80 MHZ | no puncture | [1 1 1 1] (996-tone RU 1) | 0 |
| | 20 MHz puncture | [x 1 1 1] (484 + 242-tone MRU 1) | 1 |
| | | [1 x 1 1] (484 + 242-tone MRU 2) | 2 |
| | | [1 1 x 1] (484 + 242-tone MRU 3) | 3 |
| | | [1 1 1 x] (484 + 242-tone MRU 4) | 4 |
| 160 MHZ | no puncture | [1 1 1 1 1 1 1 1] (2 × 996-tone RU 1) | 0 |
| | 20 MHz puncture | [x 1 1 1 1 1 1 1] (996 + 484 + 242-tone MRU 1) | 1 |
| | | [1 x 1 1 1 1 1 1] (996 + 484 + 242-tone MRU 2) | 2 |
| | | [1 1 x 1 1 1 1 1] (996 + 484 + 242-tone MRU 3) | 3 |
| | | [1 1 1 x 1 1 1 1] (996 + 484 + 242-tone MRU 4) | 4 |
| | | [1 1 1 1 x 1 1 1] (996 + 484 + 242-tone MRU 5) | 5 |
| | | [1 1 1 1 1 x 1 1] (996 + 484 + 242-tone MRU 6) | 6 |
| | | [1 1 1 1 1 1 x 1] (996 + 484 + 242-tone MRU 7) | 7 |
| | | [1 1 1 1 1 1 1 x] (996 + 484 + 242-tone MRU 8) | 8 |

TABLE 3-continued

Values and meanings of the "punctured channel indication" field

| sensing bandwidth | puncture conditions | puncture mode | value |
|---|---|---|---|
| | 40 MHz puncture | [x x 1 1 1 1 1 1] (996 + 484-tone MRU 1) | 9 |
| | | [1 1 x x 1 1 1 1] (996 + 484-tone MRU 2) | 10 |
| | | [1 1 1 1 x x 1 1] (996 + 484-tone MRU 3) | 11 |
| | | [1 1 1 1 1 1 x x] (996 + 484-tone MRU 4) | 12 |
| 320 MHz | no puncture | [1 1 1 1 1 1 1 1] (4 × 996-tone RU 1) | 0 |
| | 40 MHz puncture | [x 1 1 1 1 1 1 1] (3 × 996 + 484-tone MRU 1) | 1 |
| | | [1 x 1 1 1 1 1 1] (3 × 996 + 484-tone MRU 2) | 2 |
| | | [1 1 x 1 1 1 1 1] (3 × 996 + 484-tone MRU 3) | 3 |
| | | [1 1 1 x 1 1 1 1] (3 × 996 + 484-tone MRU 4) | 4 |
| | | [1 1 1 1 x 1 1 1] (3 × 996 + 484-tone MRU 5) | 5 |
| | | [1 1 1 1 1 x 1 1] (3 × 996 + 484-tone MRU 6) | 6 |
| | | [1 1 1 1 1 1 x 1] (3 × 996 + 484-tone MRU 7) | 7 |
| | | [1 1 1 1 1 1 1 x] (3 × 996 + 484-tone MRU 8) | 8 |
| | 80 MHz puncture | [x x 1 1 1 1 1 1] (3 × 996-tone MRU 1) | 9 |
| | | [1 1 x x 1 1 1 1] (3 × 996-tone MRU 2) | 10 |
| | | [1 1 1 1 x x 1 1] (3 × 996-tone MRU 3) | 11 |
| | | [1 1 1 1 1 1 x x] (3 × 996-tone MRU 4) | 12 |
| | 80 MHz and 40 MHz puncture | [x x x 1 1 1 1 1] (2 × 996 + 484-tone MRU 1) | 13 |
| | | [x x 1 x 1 1 1 1] (2 × 996 + 484-tone MRU 1) | 14 |
| | | [x x 1 1 x 1 1 1] (2 × 996 + 484-tone MRU 1) | 15 |
| | | [x x 1 1 1 x 1 1] (2 × 996 + 484-tone MRU 1) | 16 |
| | | [x x 1 1 1 1 x 1] (2 × 996 + 484-tone MRU 1) | 17 |
| | | [x x 1 1 1 1 1 x] (2 × 996 + 484-tone MRU 1) | 18 |
| | | [x 1 1 1 1 1 x x] (2 × 996 + 484-tone MRU 1) | 19 |
| | | [1 x 1 1 1 1 x x] (2 × 996 + 484-tone MRU 1) | 20 |
| | | [1 1 x 1 1 1 x x] (2 × 996 + 484-tone MRU 1) | 21 |

TABLE 3-continued

Values and meanings of the "punctured channel indication" field

| sensing bandwidth | puncture conditions | puncture mode | value |
|---|---|---|---|
| | | [1 1 1 x 1 1 x x] (2 × 996 + 484-tone MRU 1) | 22 |
| | | [1 1 1 1 x 1 x x] (2 × 996 + 484-tone MRU 1) | 23 |
| | | [1 1 1 1 1 x x x] (2 × 996 + 484-tone MRU 1) | 24 |

The 'tone' in the above table represents a subcarrier, RU is a resource unit, and MRU is a maximum resource unit.

(7-7) Number of sent spatial streams: (an optional field) indicating a number of spatial streams used by the response device to send the sensing NDP in the sensing measurement process, it takes a value in a range of [1, 16].

(7-8) Beamforming setup: (an optional field) indicating how to set beamforming when the response device serves as the sensing sending device to send the sensing NDP. Its exemplary values and meanings are shown in Table 4. Values used in this field are only an exemplary introduction, and this field may also be set to other values, as long as it is ensured that the value corresponding to each beamforming setup is different from values corresponding to other beamforming setup.

TABLE 4

Meaning of the "beamforming setup" field

| value | beamforming setup |
|---|---|
| 0 | not using a beamforming steering matrix |
| 1 | using a fixed beamforming steering matrix |
| 2 | using a variable beamforming steering matrix |
| other | reserved |

An example of meanings of the beamforming setup field is as follows.

The meaning of not using a beamforming steering matrix is that the sensing sending device does not use the beamforming steering matrix to send the sensing measurement frame (NDP), in sending different sensing measurement instances using a same sensing setup.

The meaning of using a fixed beamforming steering matrix is that the sensing sending device uses the fixed beamforming steering matrix to send the sensing measurement frame (NDP), in different sensing measurement instances using the same sensing setup.

The meaning of using a variable beamforming steering matrix is that the sensing sending device uses the variable beamforming steering matrix to send the sensing measurement frame (NDP), in different sensing measurement instances using the same sensing setup.

(7-9) Measurement result reporting limit: (an optional field) indicating a time limit for reporting the measurement result when the sensing response device (Responder) serves as a sensing signal receiving device (Receiver) to participate in the measurement. Its exemplary values and meanings are shown in Table 5. Values used in this field are only an exemplary introduction, and this field may also be set to other values, as long as it is ensured that the value corresponding to each measurement result reporting limit is different from values corresponding to other measurement result reporting limits.

TABLE 5

Meaning of the "measurement result reporting limit" field

| value | measurement result reporting limit |
|---|---|
| 0 | immediate reporting; |
| 1 | delayed reporting of 1 sensing measurement instance; |
| 2 | delayed reporting of 2 sensing measurement instances |
| 3 | delayed reporting of 3 sensing measurement instances |
| 4 | delayed reporting of 4 sensing measurement instances |
| other | reserved |

(7-10) Type of reported data: (an optional field) indicating a data type of the sensing measurement result reported by the response device to the initiation device. Its values and meanings are shown in Table 6. Values used in this field are only an exemplary introduction, and this field may also be set to other values, as long as it is ensured that the value corresponding to each type of reported data is different from values corresponding to other types of reported data.

TABLE 6

Meaning of the "type of reported data" field

| value | type of reported data |
|---|---|
| 0 | CSI |
| 1 | RSSI |
| 2 | Beam SNR |
| 3 | TCIR |
| 4 | TCIR_Padding |
| 5 | TCIR_Interpolation |
| 6 | TCIR_Splicing |
| other | reserved |

An example of meanings of the type of reported data field is as follows.

When the type of reported data is CSI, it indicates that the sensing response device uses CSI defined in the 802.11n protocol for example as the type of reported data.

When the type of reported data is RSSI, it indicates that the sensing response device uses RSSI defined in the 802.11n protocol for example as the type of reported data.

When the type of reported data is Beam SNR, it indicates that the sensing response device uses Beam SNR defined in the 802.11n protocol for example as the type of reported data.

When the type of reported data is TCIR, it indicates that the sensing response device uses a predefined TCIR as the type of reported data.

When the type of reported data is TCIR_Padding, it indicates that the sensing response device uses the padded TCIR proposed in the disclosure as the type of reported data. A specific implementation of the type of reported data may be as follows. First, CSI data points with a value of 0 are padded at an end of measured N-point CSI original data, where a length of padded CSI data=N×IFFT enhancement factor; then, IFFT of (N×IFFT enhancement factor) points is performed on the padded CSI data, to obtain CIR data of the (N×IFFT enhancement factor) points; and finally, a part of segments in the CIR data is truncated according to requirements of the sensing initiation device, and resulting data is reported.

When the type of reported data is TCIR_Interpolation, it indicates that the sensing response device uses the interpolated TCIR proposed in the disclosure as the type of reported data. A specific implementation of the type of reported data may be as follows. First, a number (IFFT enhancement factor-1) of CSI data points are interpolated after each data point of measured N-point CSI original data, where a length of interpolated CSI data=N×IFFT enhancement factor; then, IFFT of (N×IFFT enhancement factor) points is performed on the interpolated CSI data, to obtain CIR data of the (N×IFFT enhancement factor) points; and finally, a part of segments in the CIR data is truncated according to requirements of the sensing initiation device, and resulting data is reported.

When the type of reported data is TCIR_Splicing, it indicates that the sensing response device uses the spliced TCIR proposed in the disclosure as the type of reported data. A specific implementation of the type of reported data may be as follows. First, a number "IFFT enhancement factor" of N-point CSI original data are spliced into longer CSI data in an ascending order of frequencies, where a length after splicing is (N×IFFT enhancement factor) points; then, IFFT of the (N×IFFT enhancement factor) points is performed on the spliced CSI data, to obtain CIR data of the (N×IFFT enhancement factor) points; and finally, a part of segments in the CIR data is truncated according to requirements of the sensing initiation device, and resulting data is reported.

(7-11) Coding mode of the reported data: (an optional field) indicating a data coding mode used by the response device to report the measurement result. Its values and meanings are shown in Table 7. Values used in this field are only an exemplary introduction, and this field may also be set to other values, as long as it is ensured that the value corresponding to each coding mode of the reported data is different from values corresponding to other coding modes of the reported data.

TABLE 7

Meaning of the "coding mode of the reported data" field

| Value | coding mode of the reported data |
|---|---|
| 0 | basic coding mode |
| 1 | low-complexity coding mode |
| 2 | low-overhead coding mode |
| 3 | reserved |

An example of meanings of the coding mode of the reported data field is as follows.

Basic coding mode: indicating whether the device itself supports for example an amplitude coding mode defined in the 802.11n protocol. The amplitude coding mode defined in the 802.11n protocol is used for CSI coding, and a subcarrier k in the amplitude coding mode defined in the 802.11n protocol is replaced by a delay t, so that it may be used for TCIR coding.

Low-complexity coding mode: indicating whether the device itself supports a predefined low-complexity amplitude coding mode, such as a predetermined low-complexity amplitude coding mode. The predefined low-complexity amplitude coding mode is used for CSI coding, and a subcarrier k in the predefined low-complexity amplitude coding mode is replaced by a delay t, so that it may be used for TCIR coding.

An example of the low-complexity coding mode is as follows.

a) Calculating a Scaling Factor r

An absolute value my of the largest real part/imaginary part of elements in a CSI matrix ($H_{eff}$) on each subcarrier is calculated, a maximum value for the k-th subcarrier is $m_H(k)$, and its calculation method is:

$$m_H(k) = \max\left\{\max\left\{\left|\mathrm{Re}(H_{eff(m,l)}(k))\right|_{m=1,l=1}^{m=N_r,l=N_c}\right\}, \max\left\{\left|\mathrm{Im}(H_{eff(m,l)}(k))\right|_{m=1,l=1}^{m=N_r,l=N_c}\right\}\right\}$$

In the above formula, m and l are indexes of a receiving antenna and a sending antenna respectively, and $N_r$ and $N_c$ are a row number and a column number of the matrix respectively, and represent a number of receiving antennas and a number of sending antennas respectively.

A real part and imaginary part of an original CSI matrix are represented in a Np-bit binary complement format, and values of Np may be specified by device manufacturers.

A scaling multiple is set to α, let $\alpha=2^r$, r is referred to as the scaling factor, which is configured to scale $m_H(k)$ to maximum second power in case of avoiding overflow, as shown in the following formula:

$$2^{(N_p-2)} \le \alpha m_H(k) \le 2^{(N_p-1)} - 1$$

According to the above formula, the value of the scaling factor r corresponding to the k-th subcarrier may be obtained, which avoids conversion from linearity to dB and from dB to linearity in the standards.

During feedback, the scaling factor r occupies a 3-bit field, $r\in\{0,1,2, \ldots ,7\}$, $\alpha\in\{1,2,4, \ldots ,128\}$, which are sufficient to cover a dynamic range.

b) Quantification

The real parts and imaginary parts of the elements in the CSI matrix are linearly scaled according to the scaling factor r, and then quantized into a form of $N_b$-bit binary complement, using notation in the standard, as shown in the following formulas:

$$H_{eff(m,l)}^{q(R)}(k) = \left\lfloor \alpha\ \mathrm{Re}\{H_{eff(m,l)}(k)\}\left(2^{(N_b-N_p)}\right) + 0.5\right\rfloor$$

$$H_{eff(m,l)}^{q(I)}(k) = \left\lfloor \alpha\ \mathrm{Im}\{H_{eff(m,l)}(k)\}\left(2^{(N_b-N_p)}\right) + 0.5\right\rfloor$$

In the above formula, $\lfloor\cdot\rfloor$ is a rounding down operation, $\lfloor\cdot+0.5\rfloor$ is a rounding operation, and $N_b$ is specified in the standard, which affects a CSI feedback format.

In a specific implementation, scaling and quantization are performed by using shift operations instead of multiplication and division operations, which reduces computational complexity.

Low-overhead coding mode: indicating whether the device itself supports a predefined low-overhead amplitude coding mode, such as a predetermined low-overhead amplitude coding mode. The predefined low-overhead amplitude coding mode is used for CSI coding, and a subcarrier k in the predefined low-overhead amplitude coding mode is replaced by a delay t, so that it may be used for TCIR coding.

An example of the low-overhead coding mode is as follows.

a) Calculating a simplified scaling factor $$M_H^{lin}$$

An absolute value $m_H$ of the largest real part/imaginary part of largest elements in a CSI matrix on each subcarrier is calculated, a maximum value for the k-th subcarrier is $m_H(k)$, and its calculation method is:

$$m_H(k) = \max\{\max\{|\mathrm{Re}(H_{eff(m,l)}(k))|_{m=1,l=1}^{m=N_r,l=N_c}\}, \max\{|\mathrm{Im}(H_{eff(m,l)}(k))|_{m=1,l=1}^{m=N_r,l=N_c}\}\}$$

In the above formula, m and l are indexes of a receiving antenna and a sending antenna respectively, and $N_r$ and $N_c$ are a row number and a column number of the matrix respectively, and represent a number of receiving antennas and a number of sending antennas respectively.

The simplified scaling factor $$M_H^{lin}$$

is obtained according to $m_H(k)$, as shown below:

$$M_H^{lin} = \max\{m_H(k)\}_{k=-N_{SR}}^{k=N_{SR}}$$

$$M_H^{lin}$$

may be any real number greater than 0, therefore it is recommended to quantize an integer part and a fractional part separately. For example, the integer part is quantized to 4 bits, and the fractional part is quantized to 12 bits, therefore the scaling factor $$M_H^{lin}$$

occupies a total of 16 bits during feedback.

b) Quantification

The real parts and imaginary parts of the elements in the CSI matrix are linearly scaled according to the scaling factor $$M_H^{lin},$$

and then quantized into a form of $N_b$-bit binary complement, using notation in the standard, as shown in the following formulas:

$$H_{eff(m,l)}^{q(R)}(k) = \left\lfloor \frac{\mathrm{Re}\{H_{eff(m,l)}(k)\}}{M_H^{lin}}\left(2^{(N_b-1)} - 1\right) + 0.5 \right\rfloor$$

$$H_{eff(m,l)}^{q(I)}(k) = \left\lfloor \frac{\mathrm{Im}\{H_{eff(m,l)}(k)\}}{M_H^{lin}}\left(2^{(N_b-1)} - 1\right) + 0.5 \right\rfloor$$

In the above formula, $\lfloor\cdot\rfloor$ is a rounding down operation, $\lfloor\cdot+0.5\rfloor$ is a rounding operation, and $N_b$ is specified in the standard, which affects a CSI feedback format.

(7-12) Number of coding bits of the reported data: (an optional field) indicating a number of data coding bits used by the response device to report the measurement result. Its values and meanings are shown in Table 8. Values used in this field are only an exemplary introduction, and this field may also be set to other values, as long as it is ensured that the value corresponding to each number of coding bits of the reported data is different from values corresponding to other number of coding bits of the reported data.

TABLE 8

Meaning of the "number of coding bits of the reported data" field

| Value | number of coding bits of the reported data |
|---|---|
| 0 | 8 |
| 1 | 9 |
| 2 | 10 |
| 3 | 11 |
| 4 | 12 |
| 5 | 13 |
| 6 | 14 |
| Other | reserved |

(7-13) Number of received RF chains: (an optional field) indicating a number of RF chains used by the response device to receive the sensing NDP in the sensing measurement process, also indicating a number of RF chains to be reported later, and taking a value in a range of [1, 16].

Figure 15:
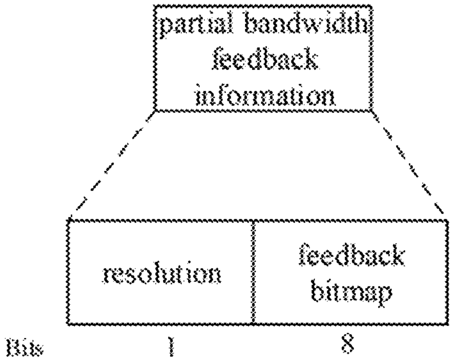
FIG. 15 is a schematic diagram of a partial bandwidth feedback information field.

(7-14) Partial bandwidth feedback information: (an optional field) indicating a frequency range in which the sensing receiving device reports the sensing measurement result data to the sensing sending device. This field includes two subfields, i.e., resolution and feedback bitmap, as shown in FIG. 15. The resolution subfield indicates a unit bandwidth represented by each bit in the feedback bitmap subfield. The feedback bitmap subfield indicates a request situation of each unit bandwidth from a lowest frequency to a highest frequency. Specifically, a bit, adjacent to the resolution field, in the feedback bitmap subfield indicates a lowest resolution bandwidth. If feedback is requested on one or several unit bandwidths, one or several corresponding bits in the feedback bitmap subfield need to be set to 1.

(7-15) Grouping factor: (an optional field) indicating a grouping factor used by the response device to report a measurement result of the data type. Its exemplary values and meanings are shown in Table 9. Values used in this field are only an exemplary introduction, and this field may also be set to other values, as long as it is ensured that the value corresponding to each grouping factor is different from values corresponding to other grouping factors.

TABLE 9

Meaning of the "grouping factor" field

| Value | grouping factor |
|---|---|
| 0 | 1 |
| 1 | 2 |
| 2 | 4 |
| 3 | 8 |
| 4~7 | reserved |

(7-16) IFFT enhancement factor: (an optional field) indicating an IFFT enhancement factor used by the response device to report a measurement result of the data type TCIR_Padding or TCIR_Interpolation or TCIR_Splicing. The meaning of its indicated value is a multiple of a length of original CSI data that is compared to a length of padded, interpolated or spliced CSI data, and is also a multiple of an original number of IFFT operation points that is compared to a number of IFFT operation points. Its exemplary values and meanings are shown in Table 10. Values used in this field are only an exemplary introduction, and this field may also be set to other values, as long as it is ensured that the value corresponding to each IFFT enhancement factor is different from values corresponding to other IFFT enhancement factors.

TABLE 10

| Meaning of the "IFFT enhancement factor" field | |
|---|---|
| value | IFFT enhancement factor |
| 0 | 1 |
| 1 | 2 |
| 2 | 4 |
| 3 | Reserved |

(7-17) Measurement threshold setup: (an optional field) indicating how to set a threshold-based reporting mode when the sensing response device serves as a sensing receiving device. Its exemplary values and meanings are shown in Table 11. Values used in this field are only an exemplary introduction, and this field may also be set to other values, as long as it is ensured that the value corresponding to each measurement threshold setup is different from values corresponding to other measurement threshold setup.

TABLE 11

| Meaning of the "measurement threshold setup" field | |
|---|---|
| value | measurement threshold setup |
| 0 | not using threshold-based measurement reporting |
| 1 | reporting only when measurement result variation exceeds 5% |
| 2 | reporting only when the measurement result variation exceeds 10% |
| 3 | reporting only when the measurement result variation exceeds 15% |
| . . . | . . . |
| 20 | reporting only when the measurement result variation exceeds 100% |
| other | Reserved |

Figure 16:
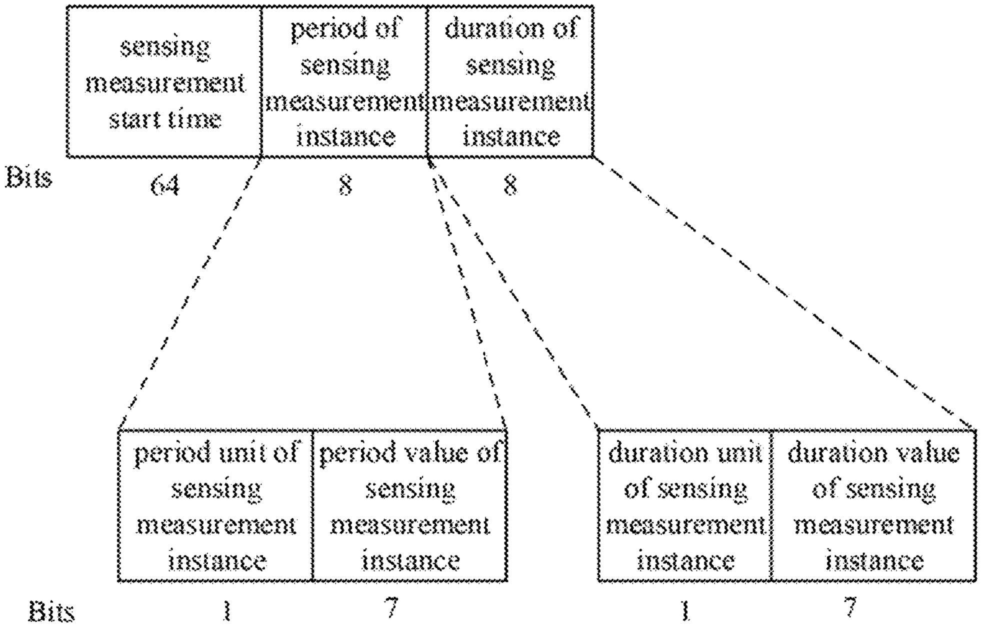
FIG. 16 is a schematic diagram of a format of a sensing measurement timing field.

(7-18) Sensing measurement timing: (an optional field) as shown in FIG. 16, it includes three subfields, i.e., sensing measurement start time, period of a sensing measurement instance, and duration of a sensing measurement instance. These subfields may inform the sensing responsive device of time scheduling of the sensing measurement.

(7-18-1) Sensing measurement start time: indicating a value of TSF at a start moment of a first sensing measurement instance.

(7-18-2) Period of a sensing measurement instance: indicating a period during which a sensing measurement instance appears repeatedly. This field may include a period unit of the sensing measurement instance and a period value of the sensing measurement instance.

Period unit of the sensing measurement instance: indicating a size of a unit time. Its exemplary values and meanings are shown in Table 12.

TABLE 12

| Meaning of the "period unit of the sensing measurement instance" field | |
|---|---|
| value | period unit of the sensing measurement instance |
| 0 | 1 ms |
| 1 | 10 ms |

Period value of the sensing measurement instance: indicating a size of the period of the sensing measurement instance, and a unit thereof is the period unit of the sensing measurement instance. An exemplary calculation method may be: the period of the sensing measurement instance=the period unit of the sensing measurement instance×the period value of the sensing measurement instance.

(7-18-3) Duration of a sensing measurement instance: indicating duration of one sensing measurement instance. This field may include a "duration unit of the sensing measurement instance" field and a "duration value of the sensing measurement instance"

FIELD

Duration unit of the sensing measurement instance: indicating a size of a unit time. Its exemplary values and meanings are shown in Table 13.

TABLE 13

| Meaning of the "duration of the sensing measurement instance" field | |
|---|---|
| value | duration unit of the sensing measurement instance |
| 0 | 1 ms |
| 1 | 10 ms |

Duration value of the sensing measurement instance: indicating a size of the duration of the sensing measurement instance, and a unit thereof is the duration unit of the sensing measurement instance. A specific calculation method is: the duration of the sensing measurement instance=the duration unit of the sensing measurement instance×the duration value of the sensing measurement instance.

In order to enable the sensing device to correctly perform sensing measurement setup in different scenarios, existence of various subfields in the sensing measurement setup field of the sensing measurement setup request frame may have a certain constraint relationship.

1. When the "role of the sensing response device" field is a sensing sending device, the "number of sent spatial streams" field and the "beamforming setup" field are present, the "punctured channel indication" field and the "sensing measurement timing" field may be present, and other optional fields are not present.

2. When the "role of the sensing response device" field is a sensing receiving device, the "measurement result reporting limit" field, the "type of reported data" field, the "coding mode of the reported data" field, the "number of coding bits of the reported data" field, the "number of received RF chains" field, the "partial bandwidth feedback information" field, the "measurement threshold setup" field, and the "sensing measurement timing" field are present; the "grouping factor" field and the "IFFT enhancement factor" field may be present, and other optional fields are not present.

3. When the "role of the sensing response device" field is both a sending device and a receiving device, the "number of sent spatial streams" field, the "beamforming setup" field, the "measurement result reporting limit" field, the "type of reported data" field, the "coding mode of the reported data" field, the "number of coding bits of the reported data", the "number of received RF chains" field, the "partial bandwidth feedback information" field, and the "sensing measurement timing" field are present; the "punctured channel indication" field, the "measurement threshold setup" field, the "grouping factor" field, and the "IFFT enhancement factor" field may be present.

4. When the "role of the sensing response device" field is a sensing sending device, if the "sensing bandwidth" field is 320 MHZ, the "punctured channel indication" field is present; if the "sensing bandwidth" field is less than 320 MHZ, the "punctured channel indication" field is not present.

5. When the "type of reported data" field is TCIR_Padding or TCIR_Interpolation or TCIR_Splicing, the "IFFT enhancement factor" field is present; when the "type of reported data" field is not TCIR_Padding, TCIR_Interpolation and TCIR_Splicing, the "IFFT enhancement factor" field is not present.

In order to further explain the method of using the sensing measurement setup request frame, several different examples are listed below.

First example: the sensing response device serves as a sensing sending device (the sensing bandwidth is 320 MHz)

Figure 17:
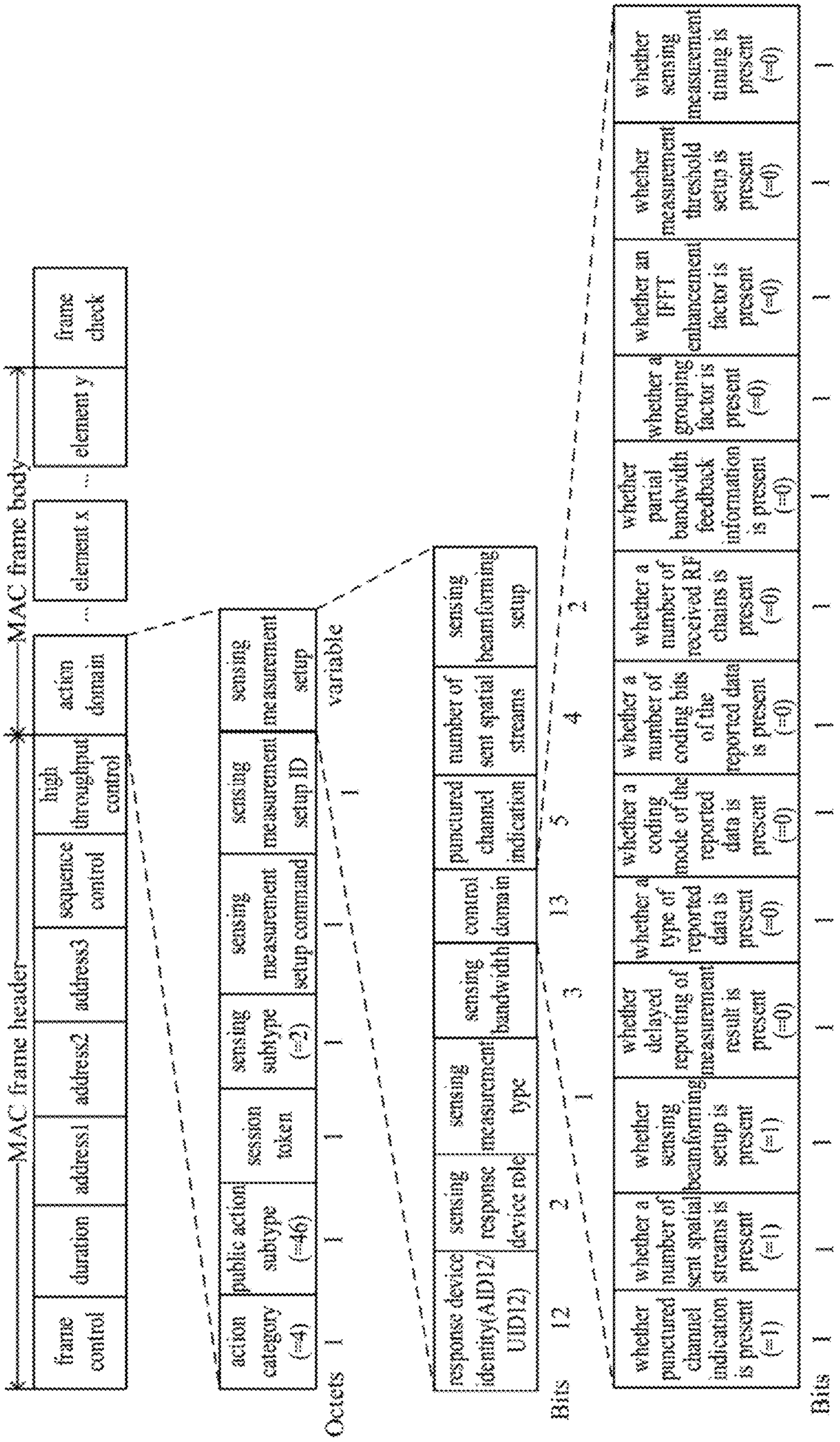
FIG. 17 is a schematic diagram of a first example of a sensing measurement setup request frame.

When the sensing response device serves as the sensing sending device, it only needs to send a corresponding sensing measurement frame (NDP) according to requirements of the sensing initiation device (a sensing receiving device), and it does not need to receive the sensing NDP and report result data of the sensing measurement. Furthermore, since the bandwidth used by the sensing response device is 320 MHZ, it needs to carry the "punctured channel indication" field. Therefore, the sensing measurement setup request frame sent by the sensing initiation device to the sensing response device includes fields shown in FIG. 17.

Three fields of "whether punctured channel indication is present", "whether a [00400] number of sent spatial streams is present", and "whether beamforming setup is present" in the control domain field are all 1, and other fields are all 0. That is, the sensing measurement setup field of the sensing measurement setup request frame includes three optional fields, i.e., punctured channel indication, number of sent spatial streams, and beamforming setup.

Second example: the sensing response device serves as a sensing receiving device [00401] (the type of reported data is TCIR_Padding)

Figure 18:
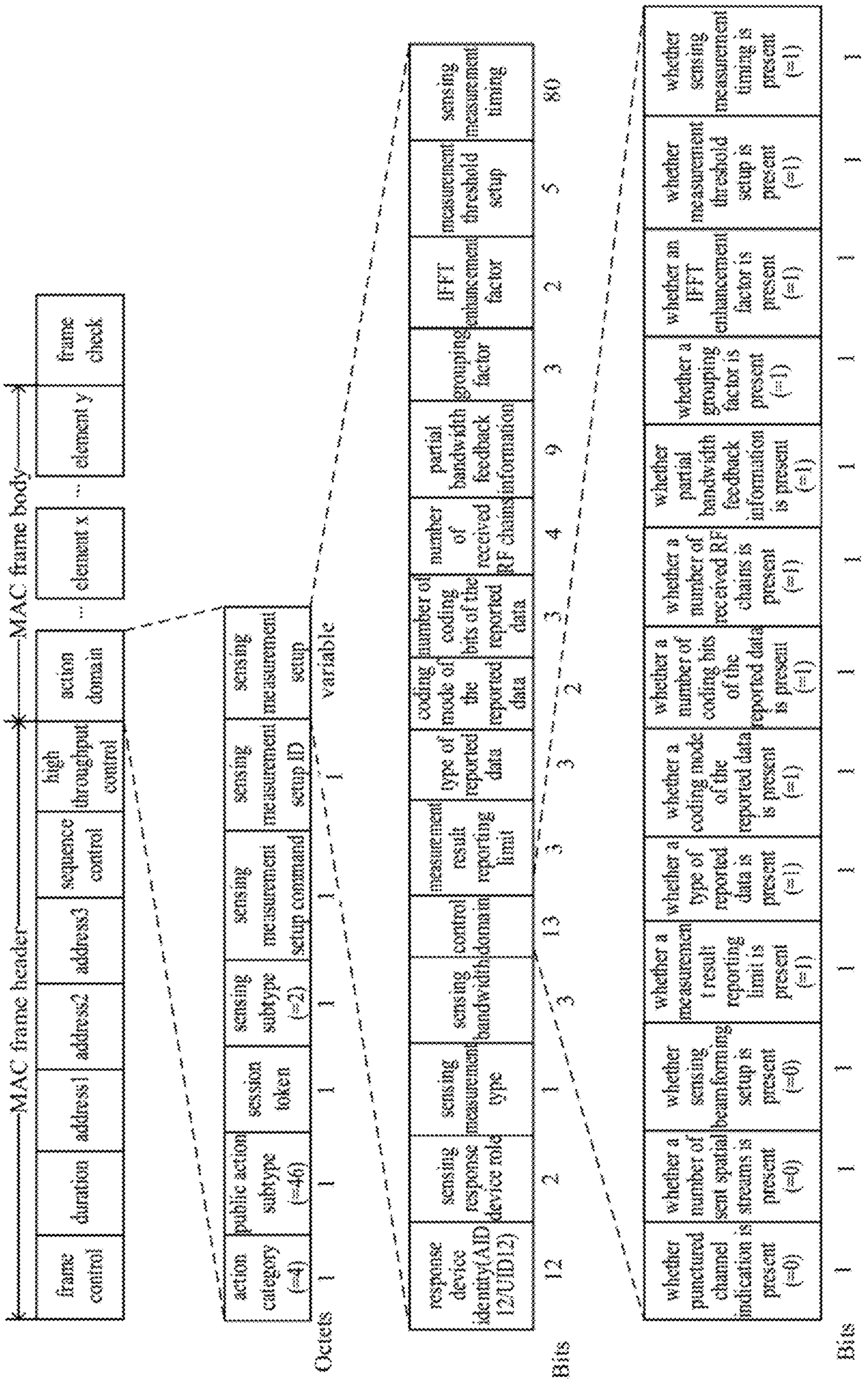
FIG. 18 is a schematic diagram of a second example of a sensing measurement setup request frame.

When the sensing response device serves as the sensing receiving device, it needs to receive the sensing NDP and report sensing measurement result data. Therefore, the sensing initiation device needs to inform the sensing receiving device how to correctly receive the sensing NDP and report the sensing measurement result data. Furthermore, since "type of reported data" is TCIR_Padding, it needs to carry an optional field "IFFT enhancement factor". Therefore, the sensing measurement setup request frame sent by the sensing initiation device to the sensing response device includes fields shown in FIG. 18.

Subfields of "whether a number of sent spatial streams is present", "whether punctured channel indication is present", and "whether beamforming setup is present" in the control domain field are all set to 1, and other subfields are all set to 0. That is, the sensing measurement setup field of the sensing measurement setup request frame includes the following optional fields: "measurement result reporting limit", "type of reported data", "coding mode of the reported data", "number of coding bits of the reported data", "number of received RF chains", "partial bandwidth feedback information", "grouping factor", "IFFT enhancement factor", "measurement threshold setup", and "sensing measurement timing" fields.

Third example: the sensing response device serves as both a sensing sending device (the sensing bandwidth is 160 MHZ) and a sensing receiving device (the type of reported data is CSI)

Figure 19:
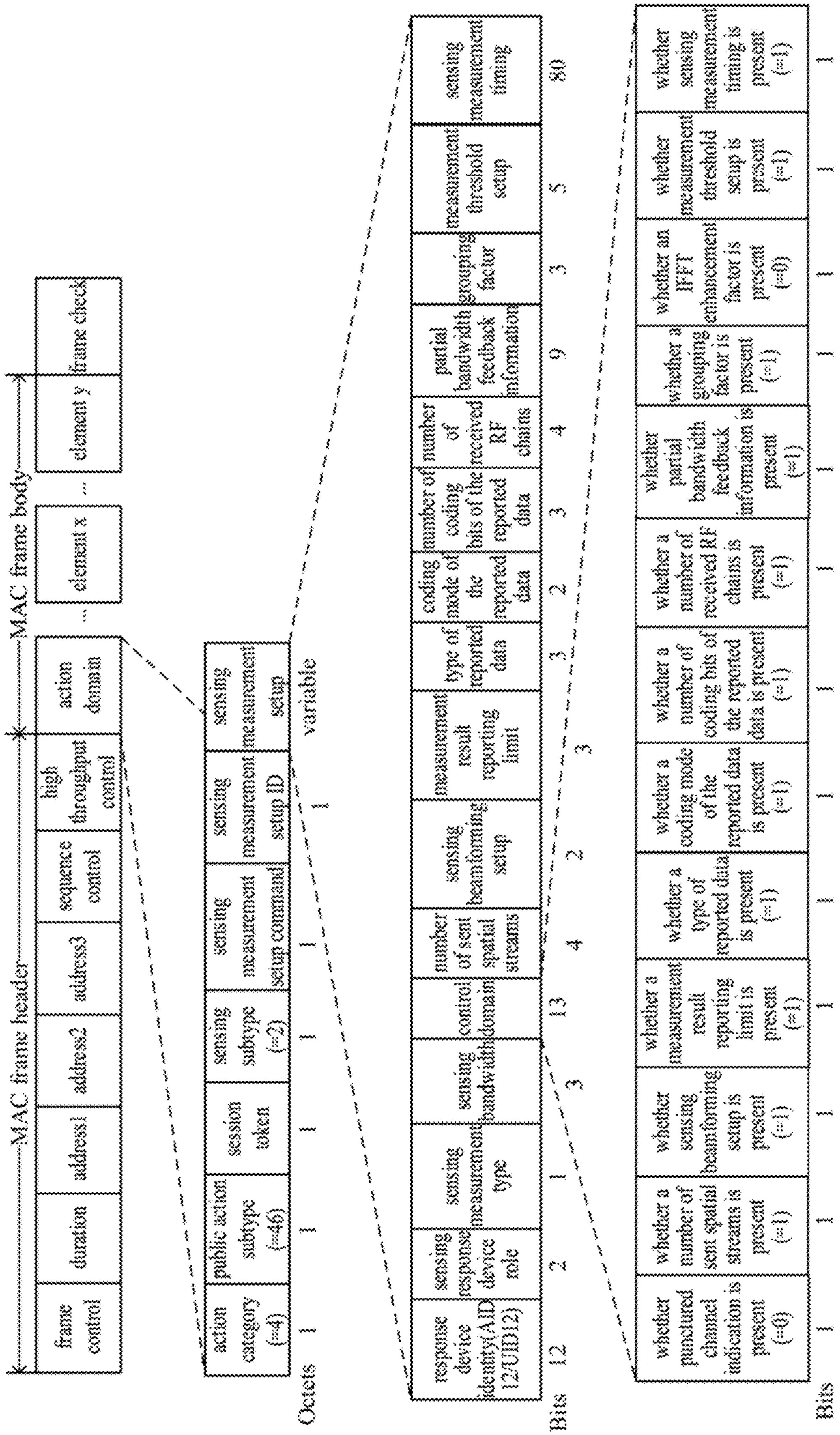
FIG. 19 is a schematic diagram of a third example of a sensing measurement setup request frame.

When the sensing response device serves as both the sensing sending device and the sensing receiving device, the sensing response device needs to send the sensing NDP, also needs to receive the sensing NDP and report sensing measurement result data. Furthermore, since "sensing bandwidth" is 160 MHz, it cannot carry an optional field "punctured channel indication". Furthermore, since the type of reported data is CSI (rather than TCIR_Padding, TCIR_Interpolation and TCIR_Splicing), the "IFFT enhancement factor" field is not present. Therefore, the sensing measurement setup request frame sent by the sensing initiation device to the sensing response device includes fields shown in FIG. 19.

Subfields of "whether punctured channel indication is present" and "whether an IFFT enhancement factor is present" in the control domain field are set to 0, and other subfields are all set to 1. That is, the sensing measurement setup field of the sensing measurement setup request frame includes all optional fields: "number of sent spatial streams", "beamforming setup", "measurement result reporting limit", "type of reported data", "coding mode of the reported data", "number of coding bits of the reported data", "number of received RF chains", "partial bandwidth feedback information", "grouping factor", "measurement threshold setup", "sensing measurement timing" fields, and does not include "punctured channel indication" and "IFFT enhancement factor".

2.2 Sensing Measurement Setup Response Frame

Figure 20:
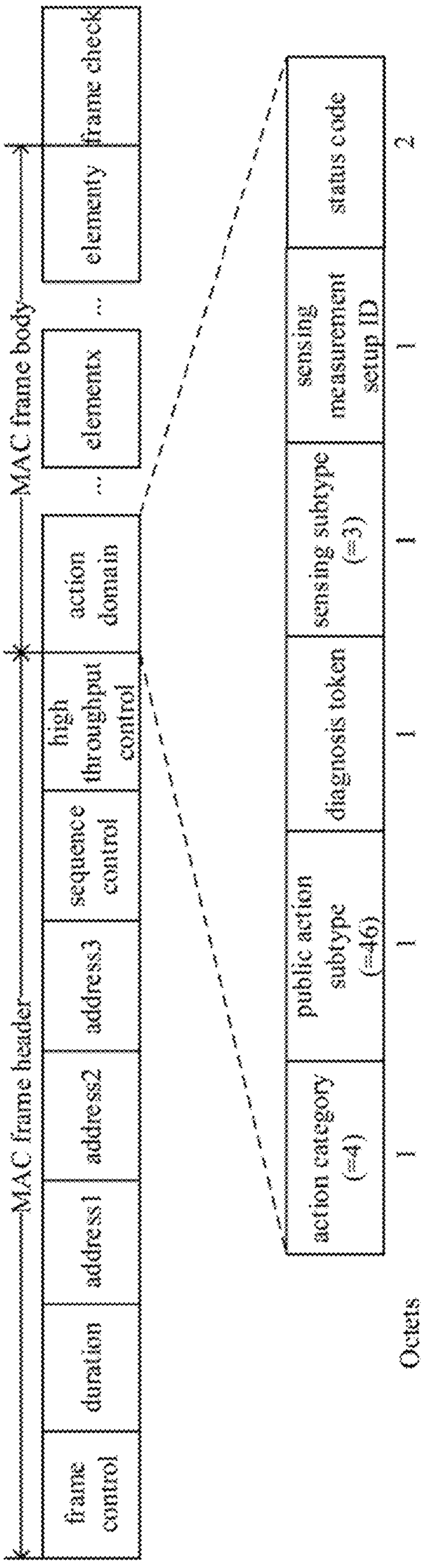
FIG. 20 is a schematic diagram of a sensing measurement setup response frame.

As shown in FIG. 20, a sensing action frame is provided, the sensing subtype takes a value of 3 (any value in a range of 0~255 may be used), to indicate the sensing measurement setup response frame.

Sensing measurement setup ID: please refer to relevant descriptions of the sensing measurement setup request frame.

Status code: indicating success or failure of the sensing measurement setup. If the sensing measurement setup was successful, the status code is set to 0. If the sensing measurement setup fails, the status code indicates a failure reason. The status code indicating the failure reason of the sensing measurement setup may take any of reserved values defined in a status code field of 802.11. Exemplary values and meanings of the status code are shown in Table 14.

TABLE 14

| Meaning of the status code | |
|---|---|
| status code | meaning |
| 0 | success |
| . . . | . . . |
| 130 | sensing measurement setup fails, since measurement result reporting time limit cannot be met |
| 131 | sensing measurement setup fails, due to low battery level |

TABLE 14-continued

| Meaning of the status code | |
|---|---|
| status code | meaning |
| 132 | sensing measurement setup fails, since communication services are busy |

The embodiments of the disclosure provide frame formats used in two phases, i.e., the sensing capability discovery phase and the sensing measurement setup phase in WiFi sensing. Support of information fields required to implement functions such as punctured channel, variable number of feedback spatial streams, variable type of reported data, variable coding mode of the reported data, variable number of coding bits of the reported data, delayed reporting of measurement results, partial bandwidth feedback, threshold measurement reporting, enhanced IFFT, or the like in WiFi sensing, is added to the frame format, which is closer to a development trend of 802.11bf standard formulation.

The functions of punctured channel, the variable number of feedback spatial streams, and the partial bandwidth feedback supported by the frame format provided in the embodiments of the disclosure may allow a volume of sensing measurement result data reported by the sensing response device to be more flexible, and the sensing initiation device may request the sensing response device to report result data in any specific range.

The function of variable type of reported data supported by the frame format provided in the embodiments of the disclosure may meet requirements of more different sensing applications, and set the type of reported data of the sensing response device according to requirements of the applications.

The function of delayed reporting of measurement results supported by the frame format provided in the embodiments of the disclosure may greatly relieve pressure of the sensing response device in processing and reporting measurement result data, it is more friendly to some devices with limited computing/storage resources, and is easy to reduce manufacturing cost of the sensing device.

The frame format provided in the embodiments of the disclosure supports selection of multiple coding modes of the reported data, so that coding modes may be selected for different scenarios. For example, when accuracy requirement of WiFi sensing is high, the 802.11n coding mode may be selected, to ensure data accuracy with a high communication overhead and a more complex scaling and quantization method; when delay requirement of WiFi sensing is high, a low-complexity coding mode may be selected, to code data in a very simple operation mode, with a cost of additional communication overhead and lower scaling and quantization accuracy; when requirement of WiFi sensing on communication overhead is high, a low-overhead coding mode may be selected, to minimize communication overhead by sacrificing quantization accuracy and operation delay.

Advantageous effects of the enhanced IFFT function supported by the frame structure provided in the embodiments of the disclosure may be described in combination with simulation results as follows.

Figure 21A:
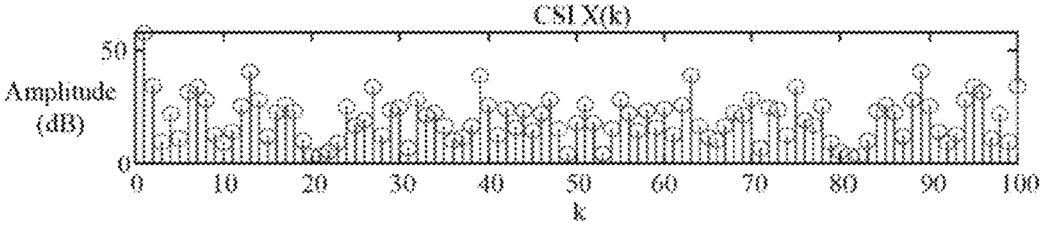
FIG. 21A and FIG. 21B are schematic diagrams of comparison between a Channel State Information (CSI) reporting type and a Truncated Channel Impulse Response (TCIR) reporting type.
Figure 21B:
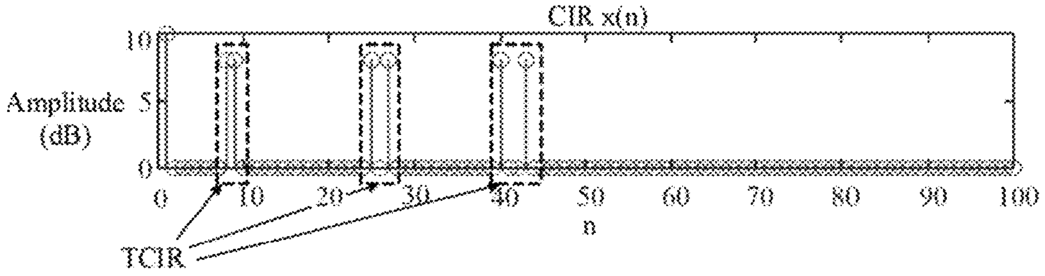

The frame format provided in the embodiments of the disclosure supports the TCIR as the type of reported data, and in some scenarios, overhead thereof is smaller than reporting bit overhead used by CSI as the relevant type of reported data. FIG. 21A and FIG. 21B show two expressions of result data of a certain WiFi sensing measurement, and a number of subcarriers is 100. CSI shows frequency response characteristics of the channel, reflects different fading of signals with different frequencies after the signals pass through the channel, and the length is 100 points. CIR shows delay response characteristics of the channel, reflects a number of paths of signal space propagation, and propagation delay and fading of each path, which are obtained from CSI through IFFT processing; and the length is also 100 points. TCIR is a part of truncated data of CIR. Generally, a part of CIR including a target path is truncated. As shown in FIG. 21, a truncated length is 12 points (a group of 4 points, a total of 3 groups) which is much smaller than 100 points of CSI, therefore it greatly reduces amount of reporting data and saves bit overhead.

The frame format provided in the embodiments of the disclosure supports enhanced IFFT processing, which may improve time resolution of TCIR. FIG. 22A, FIG. 22B, FIG. 22C and FIG. 22D compare difference between ordinary IFFT and enhanced IFFT (IFFT enhancement factor=2, the type of reported data is TCIR_Padding), the channel measured here is the same as the channel in FIG. 21, however, only measurement results when the number of subcarriers is 40 are shown.

Figure 22A:
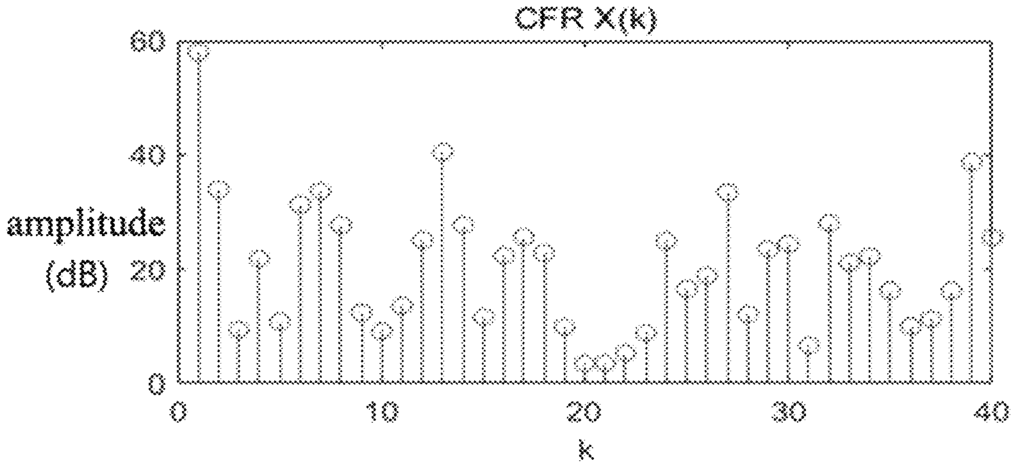
FIG. 22A, FIG. 22B, FIG. 22C and FIG. 22D are schematic diagrams of improving a time resolution of TCIR by enhanced Inverse Fourier Fast Transform (IFFT).
Figure 22B:
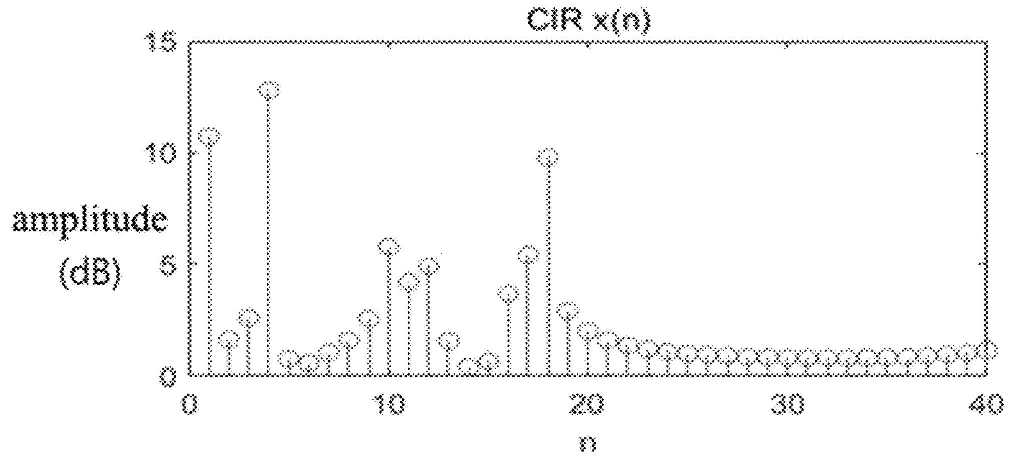

FIG. 22A and FIG. 22B are CSI obtained in an ordinary sensing measurement mode and CIR obtained in an ordinary IFFT, both have a length of 40. It may be seen that it is difficult to identify from the CIR image: three pairs of paths with adjacent delays included in CIR of FIG. 21 (as shown in the dashed box); two paths, which have adjacent delays but are separated originally, are confused into one path.

Figure 22C:
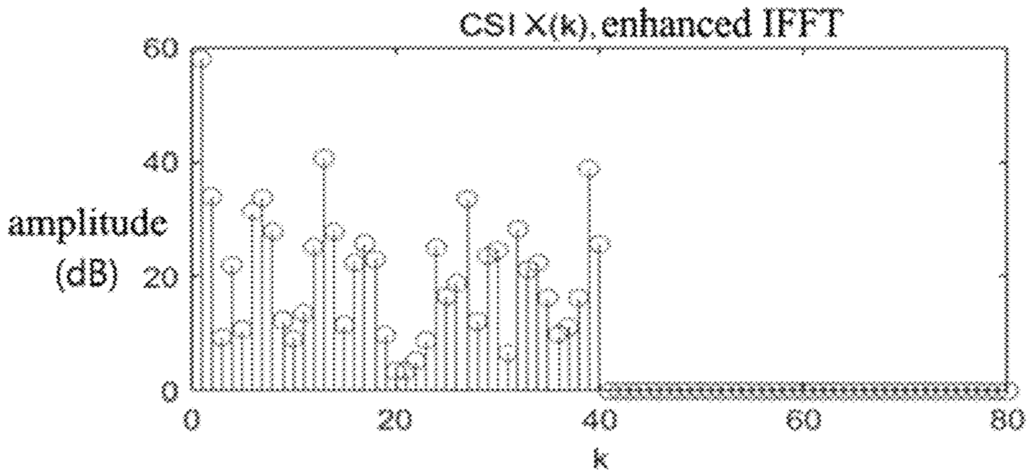
Figure 22D:
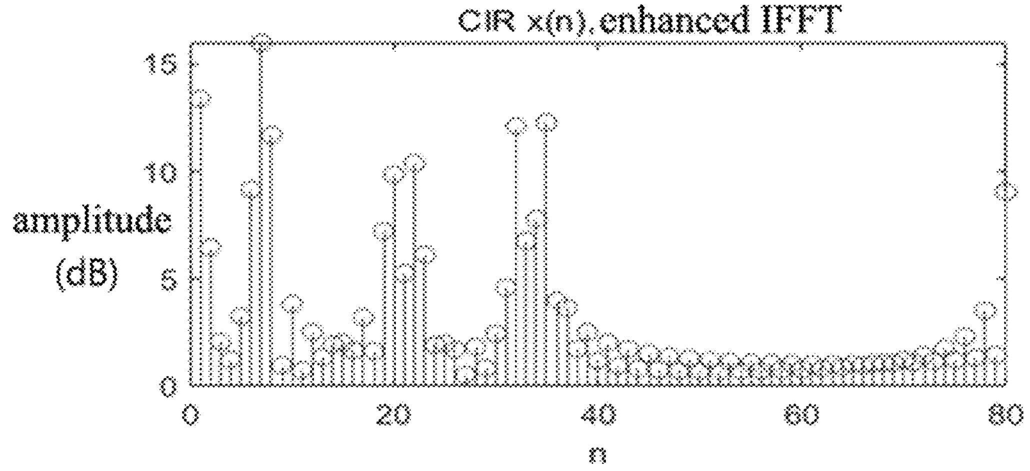

FIG. 22C and FIG. 22D are results of enhanced IFFT. Since the IFFT enhancement factor is 2 and the type of reported data is TCIR_Padding, the length of CSI is doubled to 80 points, and 40 zeros are padded after the original CSI. Then, IFFT processing is performed on 80-point CSI, to obtain 80-point CIR. It may be seen that three pairs of paths with adjacent delays with are distinguishable clearly and similar to the CIR of FIG. 21A and FIG. 21B, appear in the CIR again; while some virtual paths with large amplitudes also appear near them. With modern digital signal processing technologies, virtual paths may be ignored, and only valid paths are selected. Therefore, compared to the ordinary IFFT, the enhanced IFFT may effectively improve delay resolution of the CIR.

Figure 23:
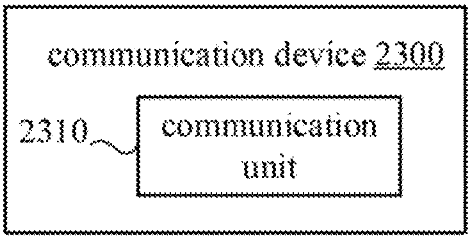
FIG. 23 is a schematic block diagram of a communication device according to an embodiment of the disclosure.

FIG. 23 is a schematic block diagram of a communication device 2300 according to an embodiment of the disclosure. The communication device 2300 may include a communication unit 2310, and the communication unit 2310 is configured to send and/or receive first information, the first information including sensing-related information.

In a possible implementation, the first information includes sensing capability information.

In a possible implementation, the sensing capability information includes an extended capability element and/or a sensing capability element.

In a possible implementation, the extended capability element and/or the sensing capability element includes a field for indicating a sensing measurement capability.

In a possible implementation, the field for indicating the sensing measurement capability includes at least one of:

a field for indicating whether a TCIR type is supported;

a field for indicating whether a non-continuous TCIR is supported;

a field for indicating whether an enhanced IFFT is supported;

- a field for indicating a maximum IFFT enhancement factor;
- a field for indicating a maximum number of spatial streams sent in sensing;
- a field for indicating a maximum number of RF chains received in sensing;
- a field for indicating whether beamforming is supported in sensing;
- a field for indicating whether a basic coding mode is supported;
- a field for indicating whether a low-complexity coding mode is supported;
- a field for indicating whether a low-overhead coding mode is supported;
- a field for indicating whether aggregated reporting of sensing measurement results is supported; or
- a field for indicating whether sensing by proxy is supported.

In a possible implementation, the field for indicating the sensing measurement capability further includes at least one of:

- a field for indicating whether a sensing sending role is supported;
- a field for indicating whether a sensing receiving role is supported;
- a field for indicating whether TB sensing is supported;
- a field for indicating whether Non-TB sensing is supported;
- a field for indicating whether a CSI type is supported;
- a field for indicating whether an RSSI type is supported; or
- a field for indicating whether a Beam SNR type supported.

In a possible implementation, a value of the field for indicating the maximum IFFT enhancement factor represents a first multiple, and a highest number of points supported by enhanced IFFT processing is the first multiple of a number of points supported by IFFT processing.

In a possible implementation, a value range of the first multiple includes a set of a finite number of positive integers.

In a possible implementation, the field for indicating the sensing measurement capability further includes at least one of: a field for indicating a maximum sensing bandwidth; or a field for indicating a maximum number of coding bits.

In a possible implementation, the field for indicating the sensing measurement capability further includes at least one of:

- a field for indicating a maximum number of spatial streams sent in sensing when a sensing bandwidth is less than or equal to a first bandwidth;
- a field for indicating a maximum number of spatial streams sent in sensing when the sensing bandwidth is equal to a second bandwidth;
- a field for indicating a maximum number of spatial streams sent in sensing when the sensing bandwidth is equal to a third bandwidth;
- a field for indicating a maximum number of RF chains received in sensing when the sensing bandwidth is less than or equal to the first bandwidth;
- a field for indicating a maximum number of RF chains received in sensing when the sensing bandwidth is equal to the second bandwidth; or
- a field for indicating a maximum number of RF chains received in sensing when the sensing bandwidth is equal to the third bandwidth.

In a possible implementation, the first bandwidth is 80 MHZ, the second bandwidth is 160 MHz, and the third bandwidth is 320 MHZ.

In a possible implementation, an element ID field of the sensing capability element takes a value of 255, to indicate that the sensing capability element is an extended element.

In a possible implementation, a value of a length field of the sensing capability element is a number of bytes of the sensing capability element except the element ID field and the length field.

In a possible implementation, an element ID extension field of the sensing capability element takes any value in a range of 94~255.

In a possible implementation, the extended capability element and/or the sensing capability element is carried in at least one of a beacon frame, a probe request frame, a probe response frame, an association request frame, an association response frame, a reassociation request frame, or a reassociation response frame.

In a possible implementation, the first information includes sensing measurement setup information.

In a possible implementation, an action domain field of the sensing measurement setup information includes a field for indicating sensing measurement setup.

In a possible implementation, the field for indicating the sensing measurement setup includes indicating at least one of:

- a field for indicating identity of a response device;
- a field for indicating a role of a sensing response device;
- a field for indicating a sensing measurement type;
- a field for indicating a sensing bandwidth;
- a control domain field;
- a field for indicating punctured channel indication;
- a field for indicating a number of sent spatial streams;
- a field for indicating beamforming setup;
- a field for indicating a measurement result reporting limit;
- a field for indicating a type of reported data;
- a field for indicating a coding mode of the reported data;
- a field for indicating a number of coding bits of the reported data;
- a field for indicating a number of received RF chains;
- a field for indicating partial bandwidth feedback information;
- a field for indicating a grouping factor;
- a field for indicating an IFFT enhancement factor;
- a field for indicating measurement threshold setup; or
- a field for indicating sensing measurement timing.

In a possible implementation, at least one of following fields is a mandatory field: the field for indicating the identity of the response device, the field for indicating the role of the sensing response device, the field for indicating the sensing measurement type, the field for indicating the sensing bandwidth, or the control domain field.

In a possible implementation, at least one of following fields is an optional field: the field for indicating the punctured channel indication, the field for indicating the number of sent spatial streams, the field for indicating the beamforming setup, the field for indicating the measurement result reporting limit, the field for indicating the type of reported data, the field for indicating the coding mode of the reported data, the field for indicating the number of coding bits of the reported data, the field for indicating the number of received RF chains, the field for indicating the partial bandwidth feedback information, the field for indicating the grouping factor, the field for indicating the IFFT enhancement factor, the field for indicating the measurement threshold setup, or the field for indicating the sensing measurement timing.

In a possible implementation, a value of the field for indicating the role of the sensing response device represents at least one of: both a sending device and a receiving device; the sending device; the receiving device; or other items.

In a possible implementation, the sensing measurement type includes a TB type and/or a Non-TB type.

In a possible implementation, a value of the field for indicating the sensing bandwidth represents at least one of 20 MHz, 40 MHZ, 80 MHz, 160 MHZ, 320 MHz, or a reserved item.

In a possible implementation, the control domain field includes a field for indicating whether at least one of following fields is present:

- the field for indicating the sensing bandwidth;
- the field for indicating the punctured channel indication;
- the field for indicating the number of sent spatial streams;
- the field for indicating the beamforming setup;
- the field for indicating the type of reported data;
- the field for indicating the coding mode of the reported data;
- the field for indicating the number of coding bits of the reported data;
- the field for indicating the measurement result reporting limit;
- the field for indicating the partial bandwidth feedback information;
- the field for indicating the grouping factor;
- the field for indicating the IFFT enhancement factor;
- the field for indicating the measurement threshold setup; or
- the field for indicating the sensing measurement timing.

In a possible implementation, a value of the field for indicating the beamforming setup represents at least one of: not using a beamforming steering matrix; using a fixed beamforming steering matrix; using a variable beamforming steering matrix; or a reserved item.

In a possible implementation, not using the beamforming steering matrix represents that a sensing sending device does not use the beamforming steering matrix to send a sensing measurement frame, in sending different sensing measurement instances using a same sensing setup.

Using the fixed beamforming steering matrix represents that the sensing sending device uses the fixed beamforming steering matrix to send the sensing measurement frame, in different sensing measurement instances using the same sensing setup.

Using the variable beamforming steering matrix represents that the sensing sending device uses the variable beamforming steering matrix to send the sensing measurement frame, in different sensing measurement instances using the same sensing setup.

In a possible implementation, a value of the field for indicating the measurement result reporting limit represents at least one of: immediate reporting; delayed reporting of 1 sensing measurement instance; delayed reporting of 2 sensing measurement instances; delayed reporting of 3 sensing measurement instances; delayed reporting of 4 sensing measurement instances; or a reserved item.

In a possible implementation, a value of the field for indicating the type of reported data represents at least one of following types of the reported data: CSI; RSSI; Beam SNR; TCIR; TCIR_Padding; TCIR_Interpolation; TCIR_Splicing; or a reserved item.

In a possible implementation, the type of reported data TCIR_Padding is for instructing the sensing response device to perform operations of: padding CSI data points with a value of 0 at an end of measured N-point CSI original data, where a length of padded CSI data=N×IFFT enhancement factor; performing IFFT of (N×IFFT enhancement factor) points on the padded CSI data, to obtain CIR data of the (N×IFFT enhancement factor) points; and truncating a part of segments in the CIR data according to requirements of a sensing initiation device, and reporting resulting data.

In a possible implementation, the type of reported data TCIR_Interpolation is for instructing the sensing response device to perform operations of: interpolating a number (IFFT enhancement factor−1) of CSI data points after each data point of measured N-point CSI original data, where a length of interpolated CSI data=N×IFFT enhancement factor; performing IFFT of (N×IFFT enhancement factor) points on the interpolated CSI data, to obtain CIR data of the (N×IFFT enhancement factor) points; and truncating a part of segments in the CIR data according to requirements of a sensing initiation device, and reporting resulting data.

In a possible implementation, the type of reported data TCIR_Splicing is for instructing the sensing response device to perform operations of: splicing a number "IFFT enhancement factor" of N-point CSI original data into longer CSI data in an ascending order of frequencies, where a length after splicing is (N×IFFT enhancement factor) points; performing IFFT of the (N×IFFT enhancement factor) points on the spliced CSI data, to obtain CIR data of the (N×IFFT enhancement factor) points; and truncating a part of segments in the CIR data according to requirements of a sensing initiation device, and reporting resulting data.

In a possible implementation, a value of the field for indicating the coding mode of the reported data represents at least one of: a basic coding mode; a low-complexity coding mode; a low-overhead coding mode; or a reserved item.

In a possible implementation, a value of the field for indicating the number of coding bits of the reported data represents at least one of 8, 9, 10, 11, 12, 13, 14, or a reserved item.

In a possible implementation, the field for indicating the partial bandwidth feedback information includes at least one of: a field for indicating resolution; or a field for indicating a feedback bitmap.

In a possible implementation, a value of the field for indicating the grouping factor represents at least one of 1, 2, 4, 8, or a reserved item.

In a possible implementation, a value of the field for indicating the IFFT enhancement factor represents a second multiple, and a length of CSI data after being processed by at least one of padding, interpolation or splicing is the second multiple of a length of original CSI data.

In a possible implementation, the second multiple includes at least one of 1, 2, 4, or a reserved item.

In a possible implementation, a value of the field for indicating the measurement threshold setup represents at least one of: not using threshold-based measurement reporting; reporting only when measurement result variation exceeds a set threshold; or a reserved item.

In a possible implementation, a range of the set threshold is greater than 0 and less than 100%.

In a possible implementation, the field for indicating the sensing measurement timing includes at least one of:

- a field for indicating a sensing measurement start time;
- a field for indicating a period of a sensing measurement instance; or a field for indicating a duration of the sensing measurement instance.

In a possible implementation, the field for indicating the period of the sensing measurement instance includes at least one of: a field for indicating a period unit of the sensing measurement instance; or a field for indicating a period value of the sensing measurement instance.

In a possible implementation, a value of the field for indicating the period unit of the sensing measurement instance represents at least one of 1 ms or 10 ms.

In a possible implementation, the field for indicating the duration of the sensing measurement instance includes at least one of: a field for indicating a duration unit of the sensing measurement instance; or a field for indicating a duration value of the sensing measurement instance.

In a possible implementation, a value of the field for indicating the duration unit of the sensing measurement instance represents at least one of 1 ms or 10 ms.

In a possible implementation, a mode of calculating the field for indicating the duration value of the sensing measurement instance includes: the duration of the sensing measurement instance=the duration unit of the sensing measurement instance×the duration value of the sensing measurement instance.

In a possible implementation, the sensing measurement setup information is carried by a sensing request frame.

In a possible implementation, the sensing request frame is a sensing measurement setup request frame.

In a possible implementation, the sensing measurement setup information includes a field for indicating a status code.

In a possible implementation, failure reasons represented by a value of the field for indicating the status code include at least one of: not meeting a measurement result reporting time limit; low battery level; or communication services are busy.

In a possible implementation, the sensing measurement setup information is carried by a sensing response frame.

In a possible implementation, the sensing response frame is a sensing measurement setup response frame.

In a possible implementation, the communication device is a sensing initiation device, the communication unit includes a first sending unit configured to send a sensing request frame carrying the sensing measurement setup information.

In a possible implementation, the communication device is a sensing initiation device, the communication unit further includes a first receiving unit configured to receive the sensing request frame carrying the sensing measurement setup information.

In a possible implementation, the communication device is a sensing response device, the communication unit includes a second receiving unit configured to receive a sensing response frame carrying the sensing measurement setup information.

In a possible implementation, the communication device is a sensing response device, the communication unit further includes a second sending unit configured to send the sensing request frame carrying the sensing measurement setup information.

The communication device 2300 of the embodiment of the disclosure may implement corresponding functions of the first device in the foregoing method 900 embodiments. Processes, functions, implementations and advantageous effects corresponding to each module (sub-module, unit, or component, etc.) in the communication device 2300 may refer to corresponding descriptions in the foregoing method embodiments, which are not elaborated herein. It is to be noted that functions described with respect to each module (sub-module, unit, or component, etc.) in the communication device 2300 of the embodiment of the disclosure may be implemented by different modules (sub-modules, units, or components, etc.) or may be implemented by the same module (sub-module, unit, or component, etc.).

Figure 24:
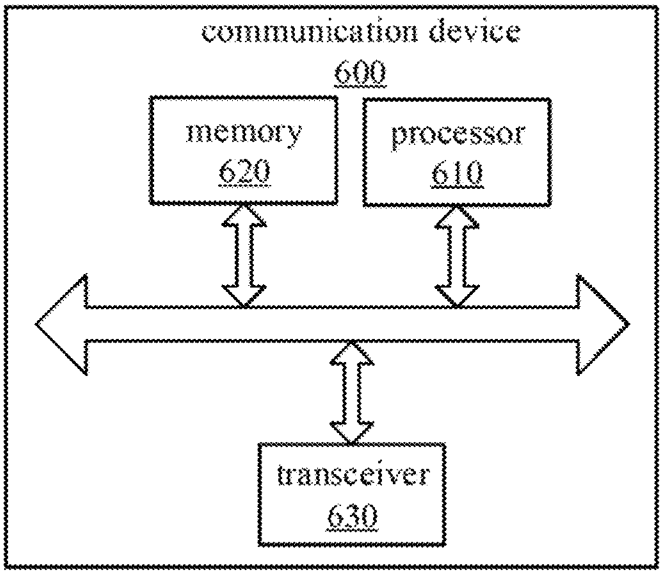
FIG. 24 is a schematic block diagram of a communication device according to an embodiment of the disclosure.

FIG. 24 is a schematic structural diagram of a communication device 600 according to an embodiment of the disclosure. The communication device 600 may include a processor 610, and the processor 610 may call and run a computer program from a memory, to enable the communication device 600 to implement the methods in the embodiments of the disclosure.

In a possible implementation, the communication device 600 may further include a memory 620. The processor 610 may call and run a computer program from the memory 620, to enable the communication device 600 to implement the methods in the embodiments of the disclosure.

The memory 620 may be a separate device independent of the processor 610, or may be integrated in the processor 610.

In a possible implementation, the communication device 600 may further include a transceiver 630, and the processor 610 may control the transceiver 630 to communicate with other devices, specifically, the processor 610 may control the transceiver 630 to send information or data to other devices, or receive information or data sent by other devices.

The transceiver 630 may include a transmitter and a receiver. The transceiver 630 may further include antennas, and there may be one or more antennas in number.

In a possible implementation, the communication device 600 may be the first device of the embodiment of the disclosure, and the communication device 600 may implement corresponding processes implemented by the first device in each of the methods of the embodiments of the disclosure, which are not elaborated herein for the sake of brevity.

Figure 25:
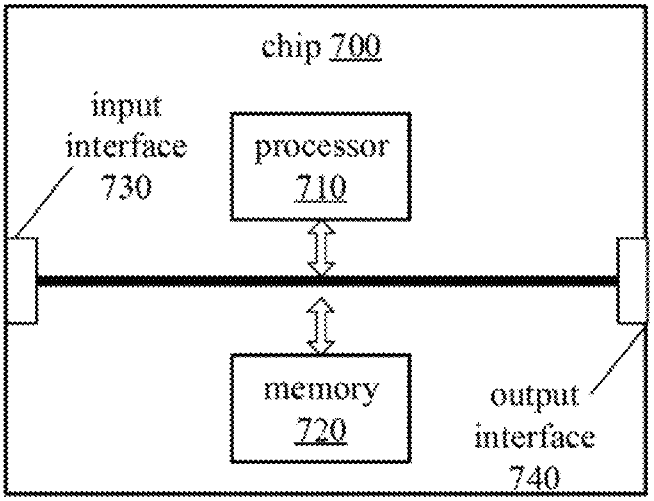
FIG. 25 is a schematic block diagram of a chip according to an embodiment of the disclosure.

FIG. 25 is a schematic structural diagram of a chip 700 according to an embodiment of the disclosure, the chip 700 includes a processor 710, and the processor 710 may call and run a computer program from a memory, to implement the methods in the embodiments of the disclosure.

In a possible implementation, the chip 700 may further include a memory 720. The processor 710 may call and run a computer program from the memory 720, to implement the methods performed by the first device in the embodiments of the disclosure.

The memory 720 may be a separate device independent of the processor 710, or may be integrated in the processor 710.

In a possible implementation, the chip 700 may further include an input interface 730. The processor 710 may control the input interface 730 to communicate with other devices or chips, specifically, the processor 710 may control the input interface 730 to obtain information or data sent by other devices or chips.

In a possible implementation, the chip 700 may further include an output interface 740. The processor 710 may control the output interface 740 to communicate with other devices or chips, specifically, the processor 710 may control the output interface 740 to output information or data to other devices or chips.

In a possible implementation, the chip may be applied to the first device of the embodiment of the disclosure, and the chip may implement corresponding processes implemented by the first device in each of the methods of the embodiments of the disclosure, which are not elaborated herein for the sake of brevity.

The chip applied to the first device may be the same or different chips.

It is to be understood that the chip mentioned in the embodiment of the disclosure may also be referred to as a system-level chip, a system chip, a chip system, or a SOC, etc.

The processor as mentioned above may be a general-purpose processor, a Digital Signal Processor (DSP), a Field Programmable Gate Array (FPGA), an ASIC or other programmable logic devices, a transistor logic device, a discrete hardware component, etc. The general-purpose processor as mentioned above may be a microprocessor, or may be any conventional processor, etc.

The memory as mentioned above may be a volatile memory or a non-volatile memory, or may include both the volatile memory and the non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It is to be understood that the above memory is an exemplary description rather than limitation. For example, the memory in the embodiment of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), etc. That is, the memory in the embodiment of the disclosure is intended to include, but is not limited to these and any other suitable types of memories.

Figure 26:
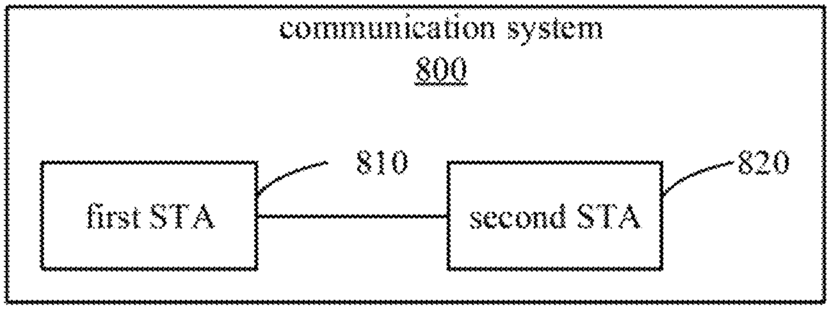
FIG. 26 is a schematic block diagram of a communication system according to an embodiment of the disclosure.

FIG. 26 is a schematic block diagram of a communication system 800 according to an embodiment of the disclosure. The communication system 800 includes a first device 810 and a second device 820. In one case, the first device 810 is configured to send first information to the second device, and the second device 820 receives the first information from the first device. In another case, the second device 820 sends first information to the first device. The first device 810 is configured to receive the first information from the second device. In the embodiment of the disclosure, the first information including sensing-related information.

In the embodiment of the disclosure, the sensing-related information may include sensing capability information and/or sensing measurement setup information. Specific descriptions of the sensing capability information and the sensing measurement setup information may refer to relevant descriptions of the above communication method embodiments.

The first device 810 may be configured to implement corresponding functions implemented by the first device in the above communication method, and the second device 820 may be configured to implement corresponding functions implemented by the second device in the above communication method, which are not elaborated herein for the sake of brevity.

All or part of the above embodiments may be implemented by software, hardware, firmware or any combination thereof. When the above embodiments are implemented with software, all or part of the above embodiments may be implemented in form of a computer program product. The computer program product includes one or more computer instructions. When the computer program instructions are loaded and executed on a computer, all or part of the processes or functions according to the embodiments of the disclosure are generated. The computer may be a general-purpose computer, a special-purpose computer, a computer network, or other programmable devices. The computer instructions may be stored in a computer-readable storage medium, or transmitted from a computer-readable storage medium to another computer-readable storage medium. For example, the computer instructions may be transmitted from a website, computer, server or data center to another website, computer, server or data center through a wired manner (such as a coaxial cable, an optical fiber, a Digital Subscriber Line (DSL)) or a wireless manner (such as infrared, wireless, microwave, etc.). The computer-readable storage medium may be any available medium which may be accessed by the computer, or a data storage device including a server, data center or the like integrated with one or more available media. The available medium may be a magnetic medium (such as a floppy disk, a hard disk, a magnetic tape), an optical medium (such as a Digital Video Disk (DVD)), or a semiconductor medium (such as a Solid State Disk (SSD)), etc.

It is to be understood that in various embodiments of the disclosure, size of a serial number of each of the above processes does not mean an order of execution. The execution order of each of the processes should be determined by its function and internal logic, and should not constitute any limitation to implementation of the embodiments of the disclosure.

It may be clearly understood by those skilled in the art that for the convenience and brevity of descriptions, specific operation processes of the above system, device and unit may refer to corresponding processes in the foregoing method embodiments, which are not elaborated herein.

The above descriptions are only specific implementations of the disclosure, however, the scope of protection of the disclosure is not limited thereto. Variations or replacements easily conceived by any technician familiar with this technical field within the technical scope disclosed in the disclosure should fall within the scope of protection of the disclosure. Therefore, the scope of protection of the disclosure shall be subjected to the scope of protection of the claims.

The invention claimed is:

1. A communication method, comprising:

sending, by a first device, a first frame, wherein the first frame comprises an element Identifier (ID) field, a length field, and sensing-related information, wherein the sensing-related information comprises following fields arranged in sequence:

- a field for indicating a maximum number of spatial streams sent in sensing when a sensing bandwidth≤80 MHz;
- a field for indicating a maximum number of spatial streams sent in sensing when the sensing bandwidth=160 MHz;
- a field for indicating a maximum number of spatial streams sent in sensing when the sensing bandwidth=320 MHz;
- a field for indicating a maximum number of Radio Frequency (RF) chains received in sensing when the sensing bandwidth≤80 MHz;
- a field for indicating a maximum number of RF chains received in sensing when the sensing bandwidth=160 MHz; and
- a field for indicating a maximum number of RF chains received in sensing when the sensing bandwidth=320 MHz.

2. The method of claim 1, wherein the first frame further comprises sensing capability information.

3. The method of claim 2, wherein the sensing capability information comprises at least one of an extended capability element or a sensing capability element.

4. The method of claim 3, wherein at least one of the extended capability element or the sensing capability element comprises a field for indicating a sensing measurement capability.

5. The method of claim 3, wherein an element ID field of the sensing capability element takes a value of 255, to indicate that the sensing capability element is an extended element.

6. The method of claim 5, wherein an element ID extension field of the sensing capability element takes any value in a range of 94~255.

7. The method of claim 1, wherein the first frame is at least one of a beacon frame, a probe request frame, a probe response frame, an association request frame, an association response frame, a reassociation request frame, or a reassociation response frame.

8. The method of claim 1, wherein each of the element ID field and the length field has 8 bits.

9. A communication device, comprising:

a processor, a memory and a transceiver, wherein the memory is configured to store computer-executable instructions; and the processor is configured to invoke and run the computer-executable instructions stored in the memory to perform:

sending a first frame through the transceiver, wherein the first frame comprises an element Identifier (ID) field, a length field, and sensing-related information, wherein the sensing-related information comprises following fields arranged in sequence:

a field for indicating a maximum number of spatial streams sent in sensing when a sensing bandwidth≤80 MHz;

a field for indicating a maximum number of spatial streams sent in sensing when the sensing bandwidth=160 MHz;

a field for indicating a maximum number of spatial streams sent in sensing when the sensing bandwidth=320 MHz;

a field for indicating a maximum number of Radio Frequency (RF) chains received in sensing when the sensing bandwidth≤80 MHz;

a field for indicating a maximum number of RF chains received in sensing when the sensing bandwidth=160 MHz; and a field for indicating a maximum number of RF chains received in sensing when the sensing bandwidth=320 MHz.

10. The device of claim 9, wherein the first frame further comprises sensing capability information.

11. The device of claim 10, wherein the sensing capability information comprises at least one of an extended capability element or a sensing capability element.

12. The device of claim 11, wherein at least one of the extended capability element or the sensing capability element comprises a field for indicating a sensing measurement capability.

13. The device of claim 11, wherein an element ID field of the sensing capability element takes a value of 255, to indicate that the sensing capability element is an extended element.

14. The device of claim 13, wherein an element ID extension field of the sensing capability element takes any value in a range of 94~255.

15. The device of claim 9, wherein the first frame is at least one of a beacon frame, a probe request frame, a probe response frame, an association request frame, an association response frame, a reassociation request frame, or a reassociation response frame.

16. A non-transitory computer-readable storage medium having stored thereon computer-executable instructions which, when executed by a processor of a first device, cause the first device to perform:

sending a first frame, wherein the first frame comprises an element Identifier (ID) field, a length field, and sensing-related information, wherein the sensing-related information comprises following fields arranged in sequence:

a field for indicating a maximum number of spatial streams sent in sensing when a sensing bandwidth≤80 MHz;

a field for indicating a maximum number of spatial streams sent in sensing when the sensing bandwidth=160 MHz;

a field for indicating a maximum number of spatial streams sent in sensing when the sensing bandwidth=320 MHz;

a field for indicating a maximum number of Radio Frequency (RF) chains received in sensing when the sensing bandwidth≤80 MHz;

a field for indicating a maximum number of RF chains received in sensing when the sensing bandwidth=160 MHz; and a field for indicating a maximum number of RF chains received in sensing when the sensing bandwidth=320 MHz.

17. The non-transitory computer-readable storage medium of claim 16, wherein the first frame further comprises sensing capability information, and wherein the sensing capability information comprises at least one of an extended capability element or a sensing capability element.

18. The non-transitory computer-readable storage medium of claim 17, wherein at least one of the extended capability element or the sensing capability element comprises a field for indicating a sensing measurement capability.

19. The non-transitory computer-readable storage medium of claim 17, wherein an element ID field of the sensing capability element takes a value of 255, to indicate that the sensing capability element is an extended element.

20. The non-transitory computer-readable storage medium of claim 19, wherein an element ID extension field of the sensing capability element takes any value in a range of 94~255.

* * * * *